F. W. LETSCH.
TYPOGRAPHIC MACHINE.
APPLICATION FILED MAR. 15, 1918.
1,381,205.
Patented June 14, 1921.
25 SHEETS—SHEET 8.
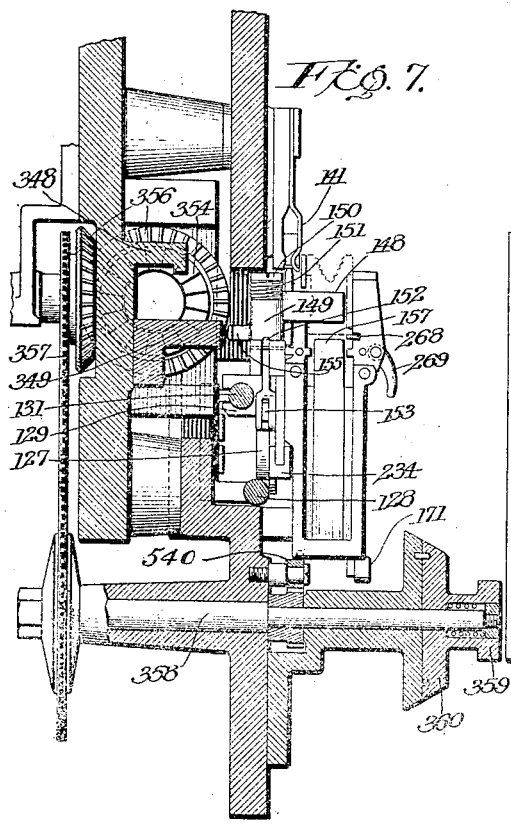
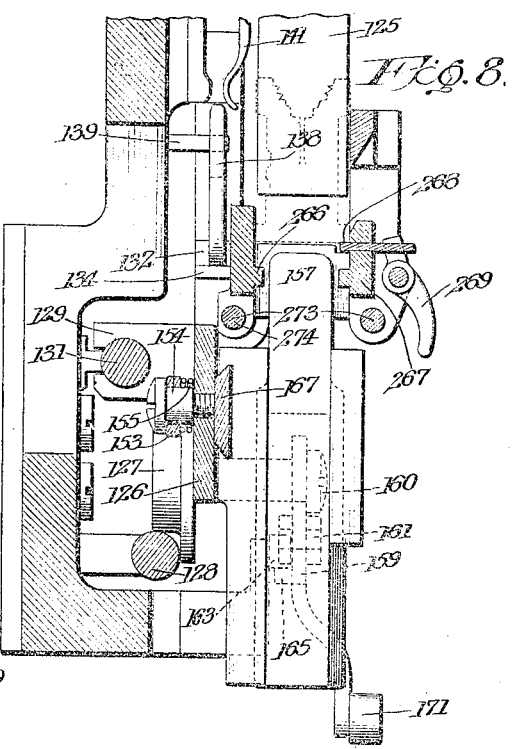
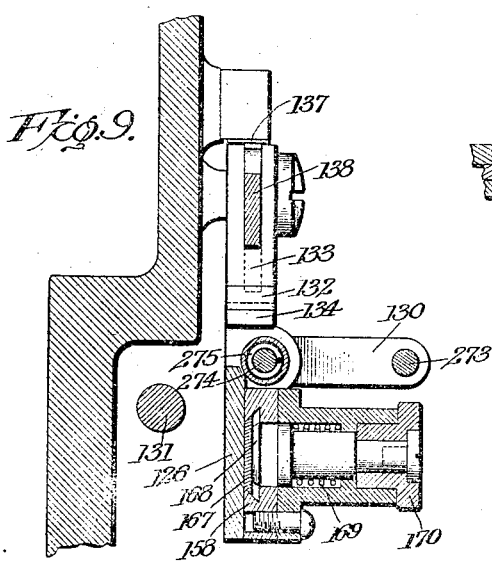
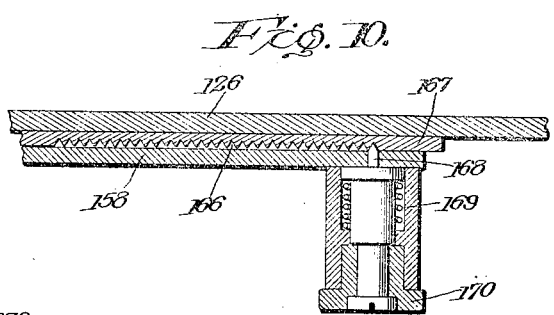
Inventor
F. W. Letsch
By Foster Freeman Watson Hirt
Attorney

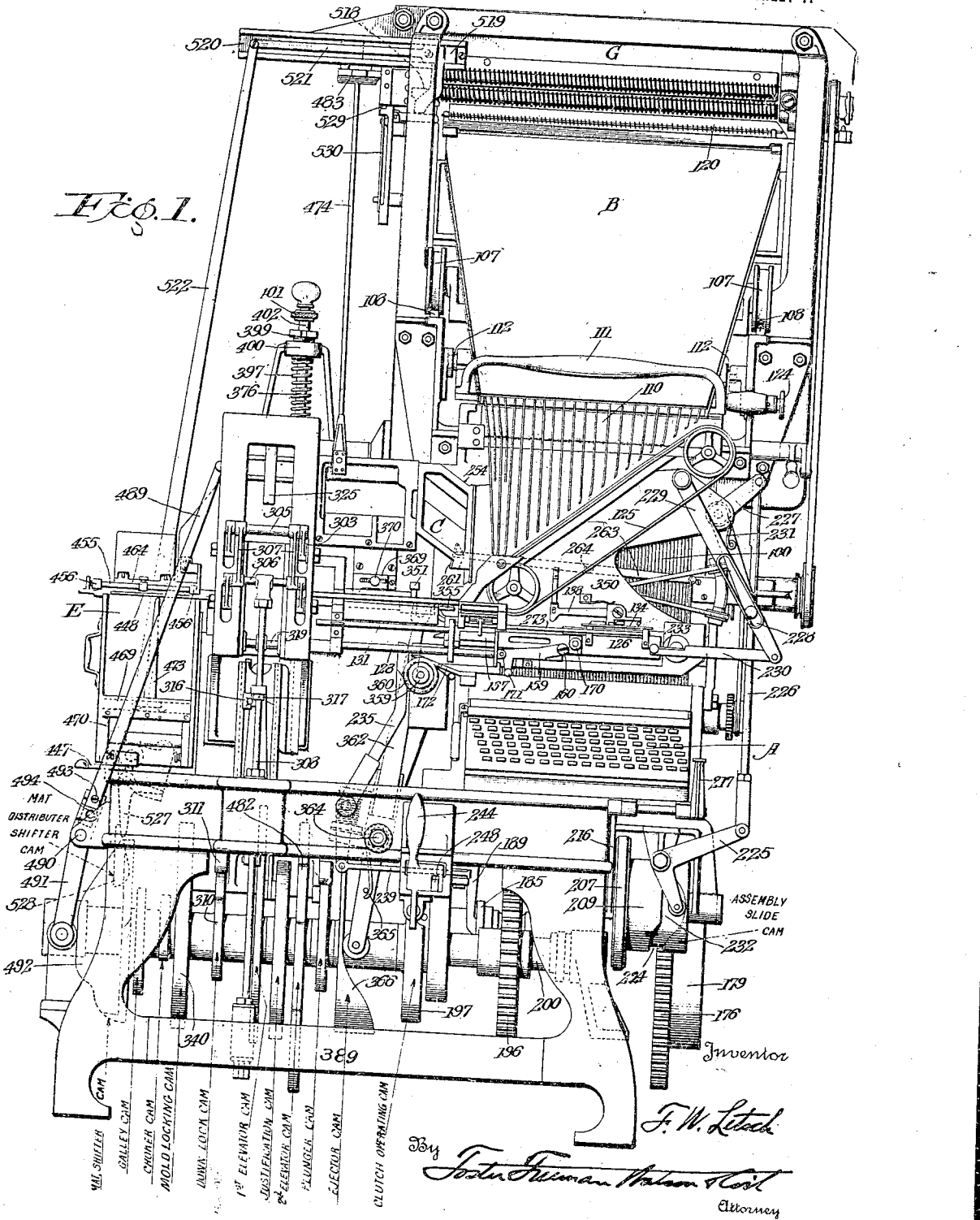

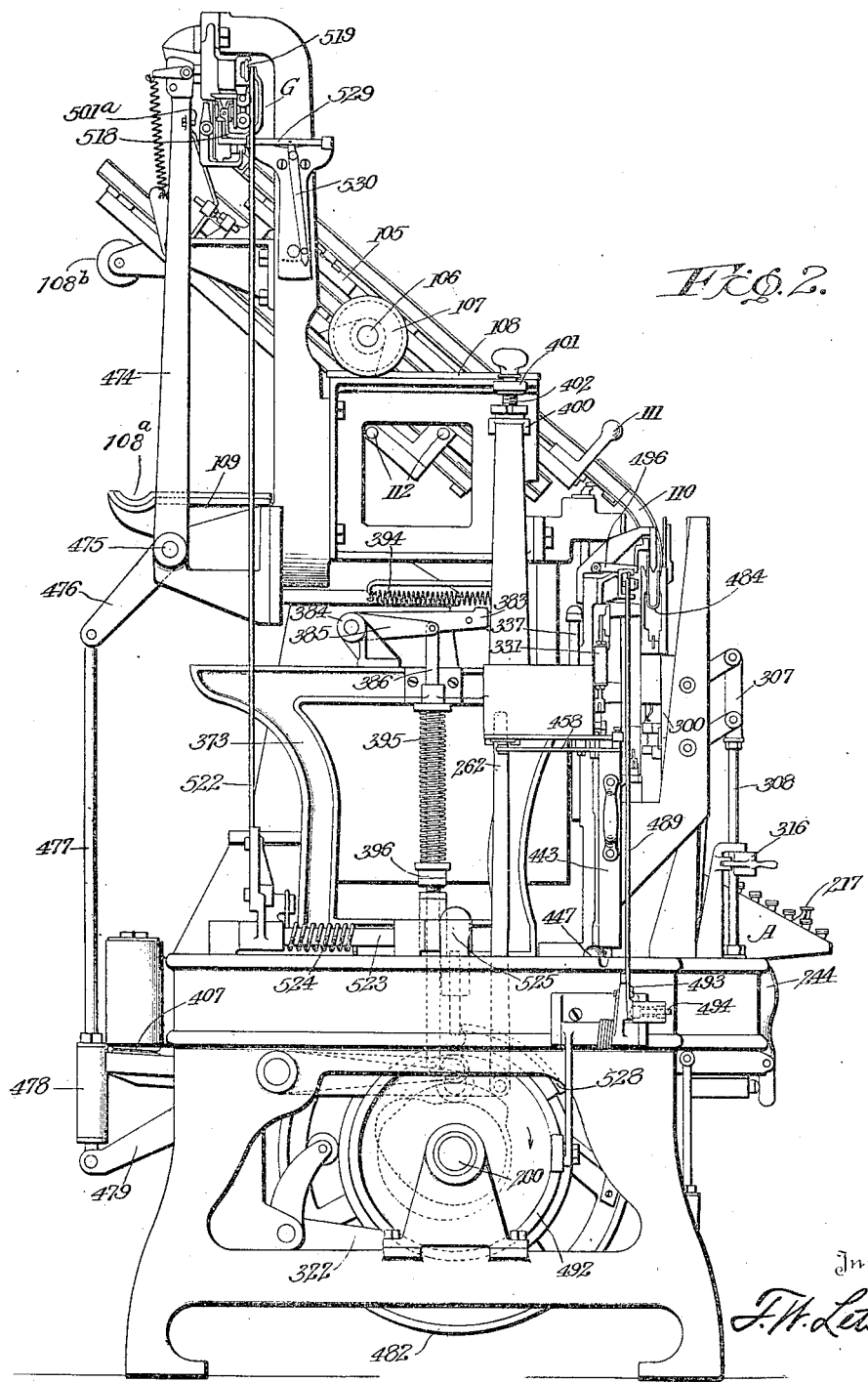

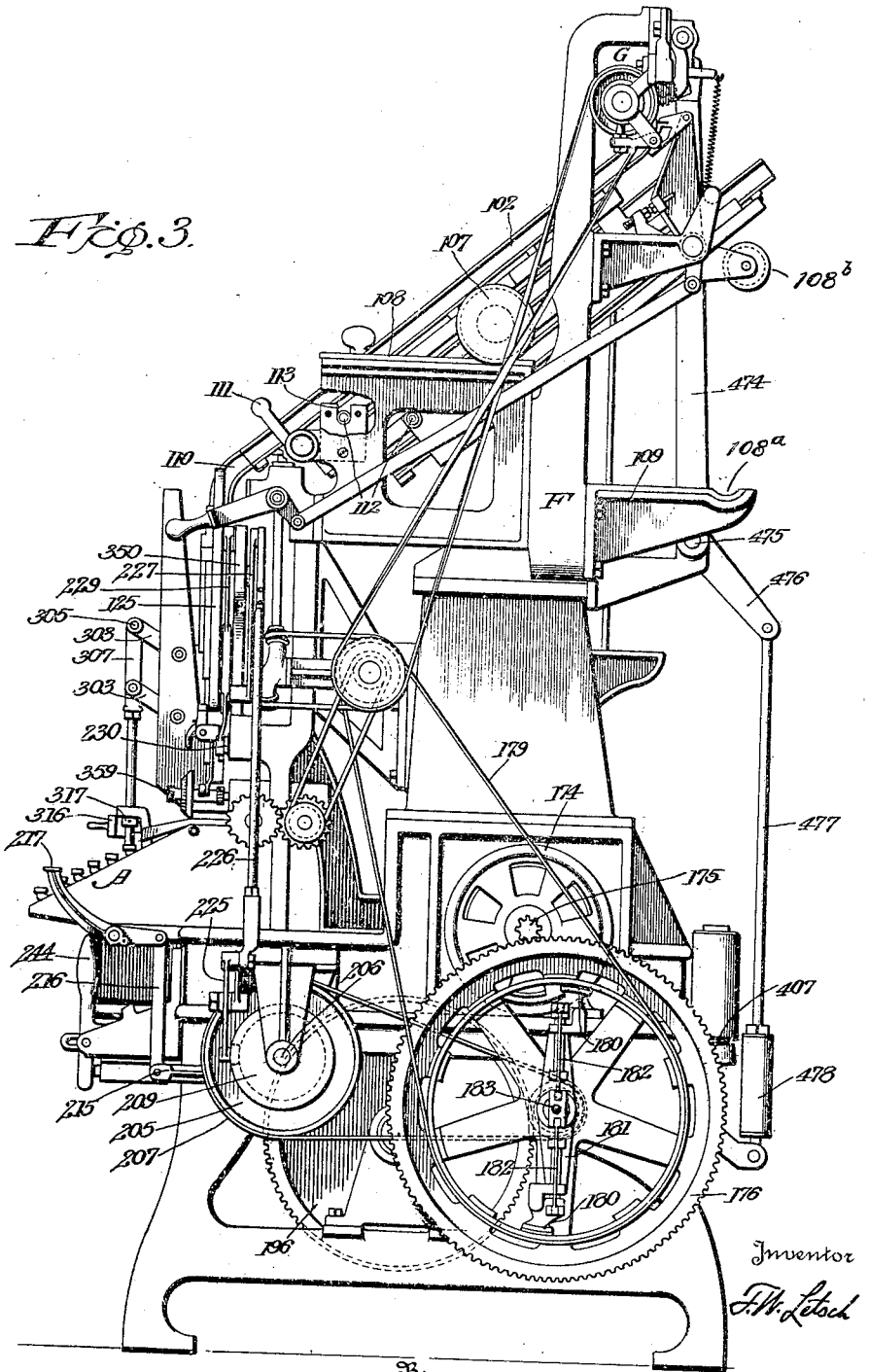

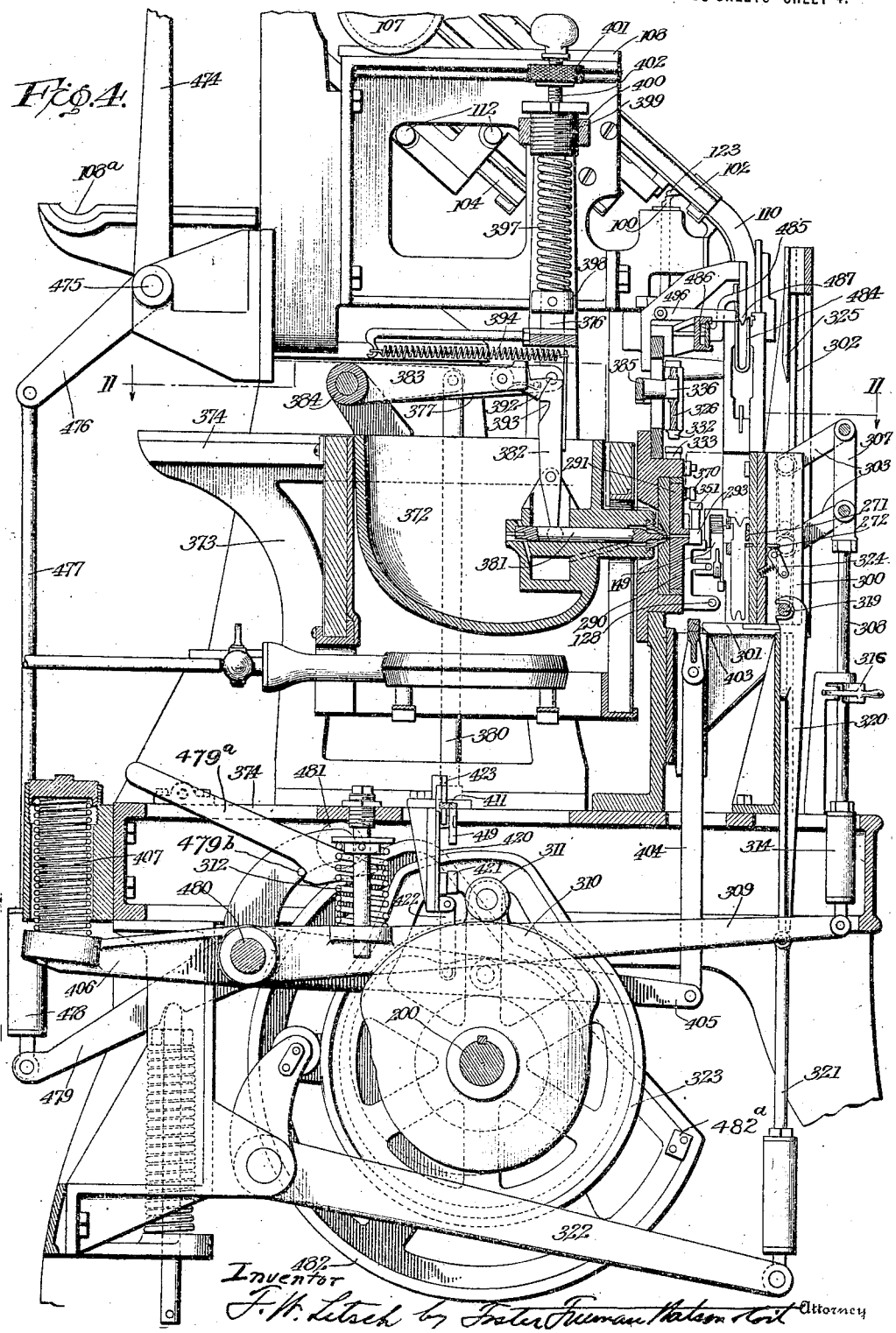

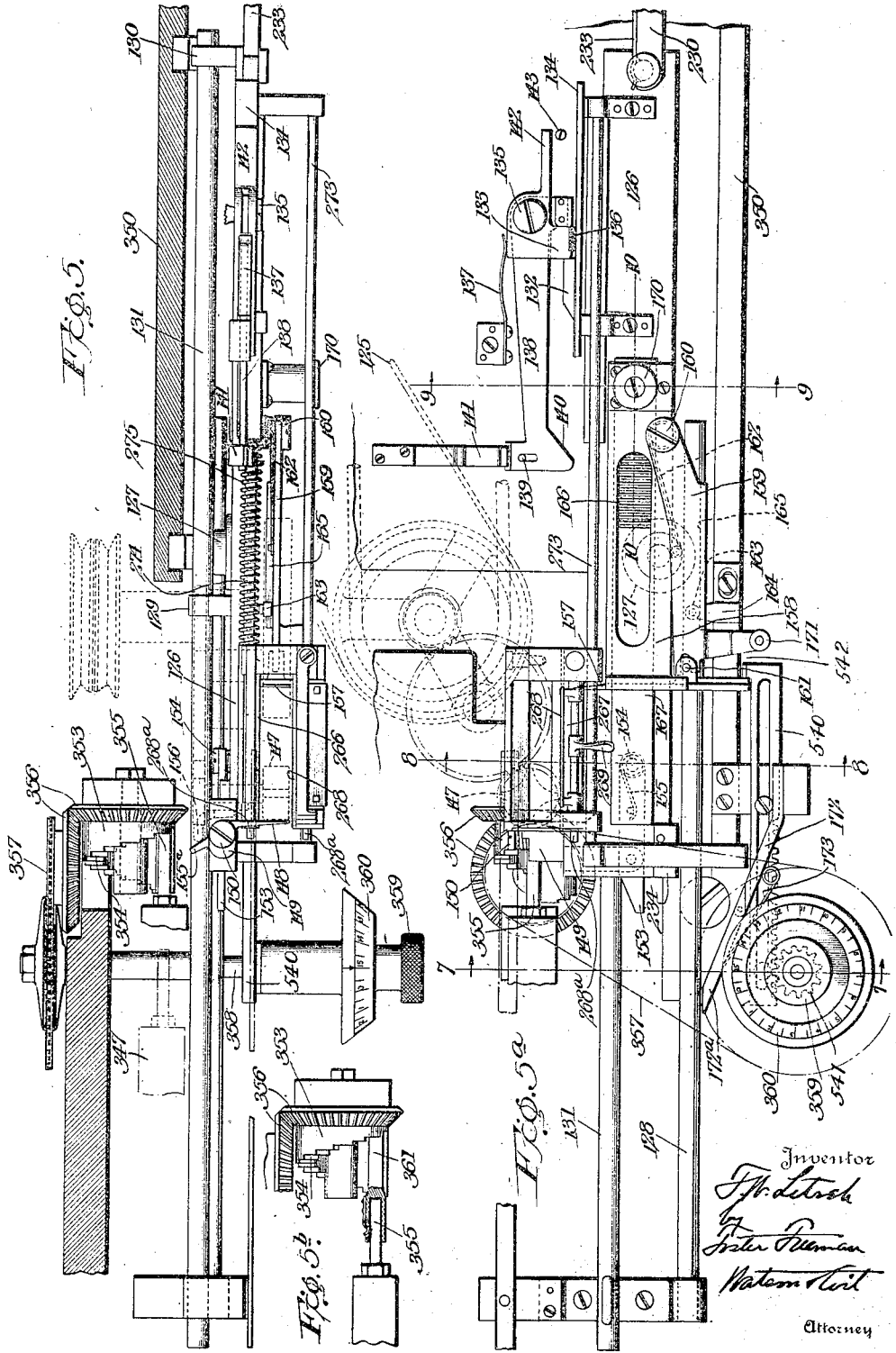

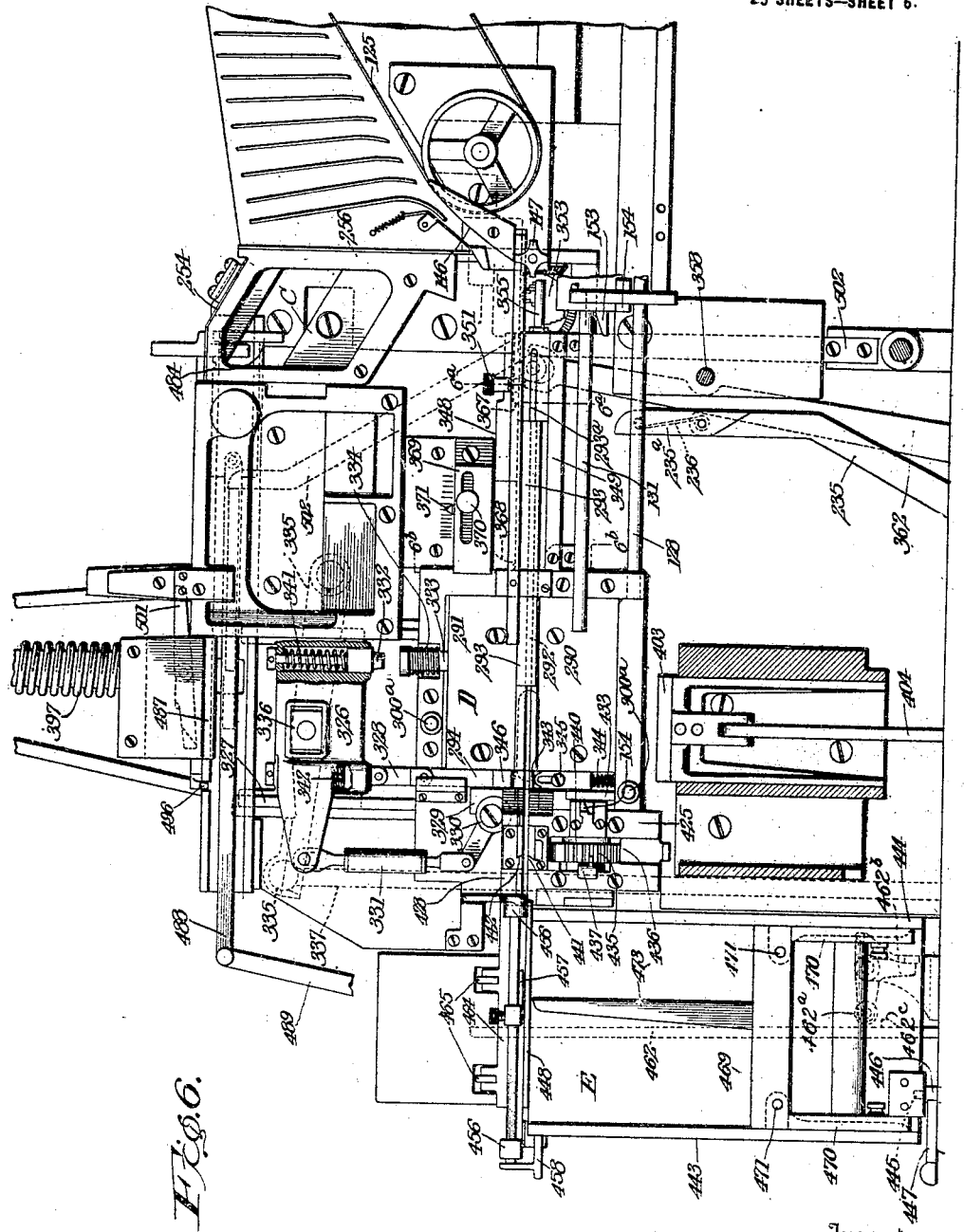

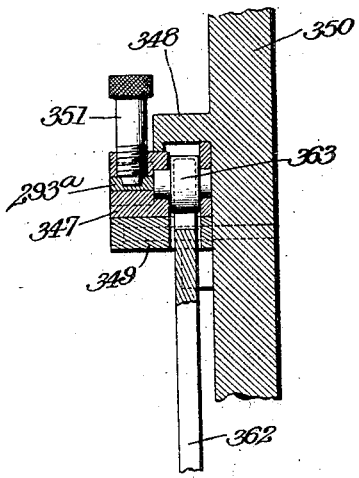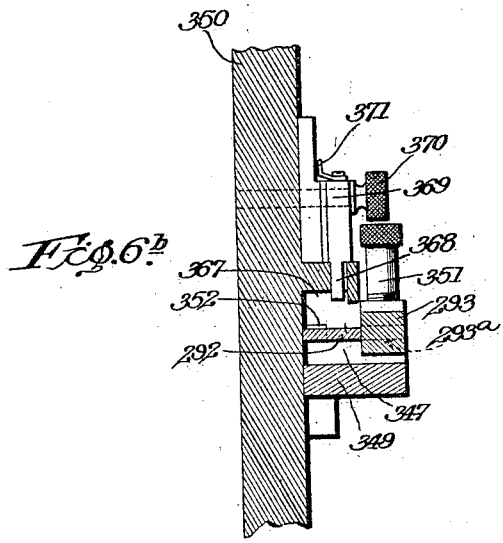

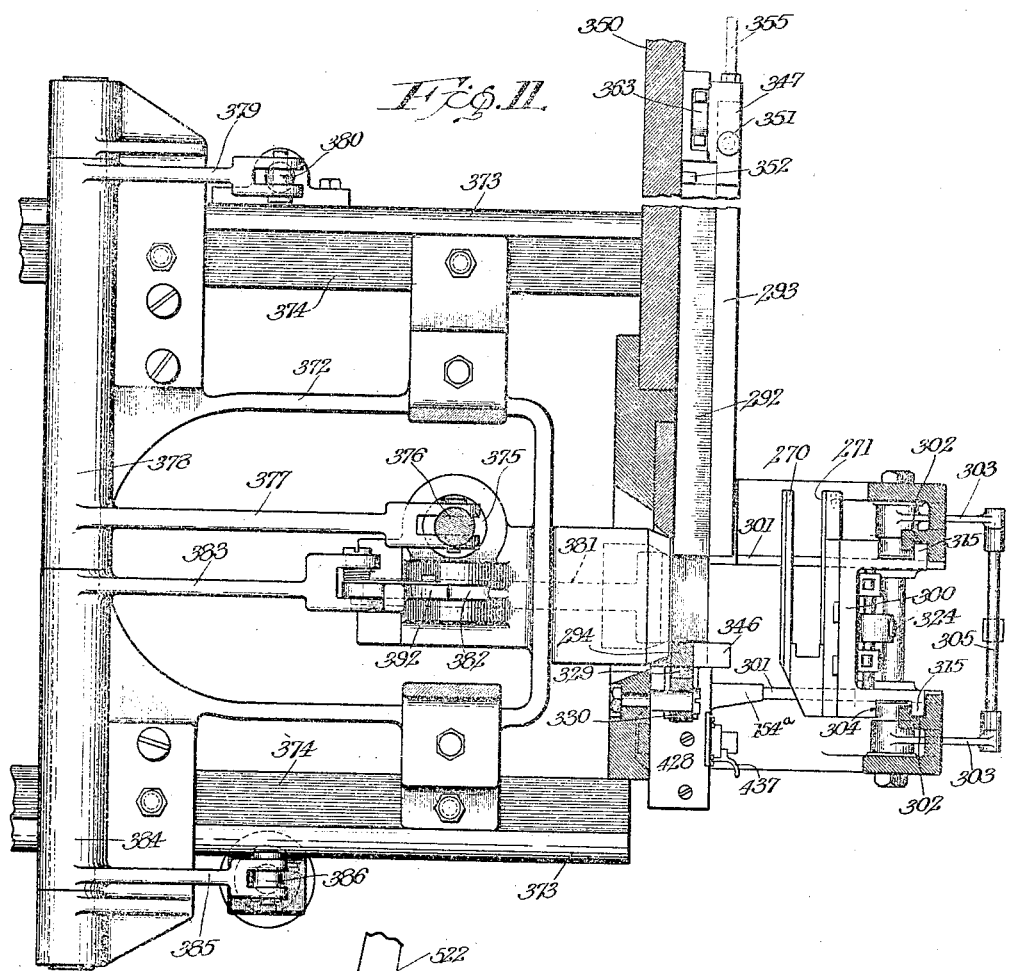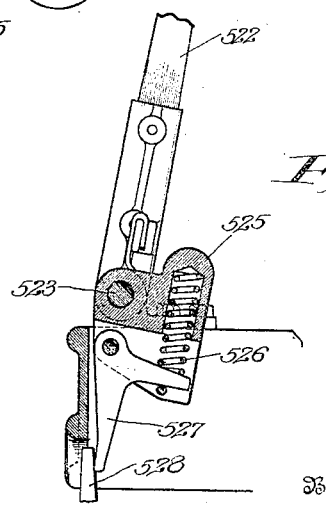

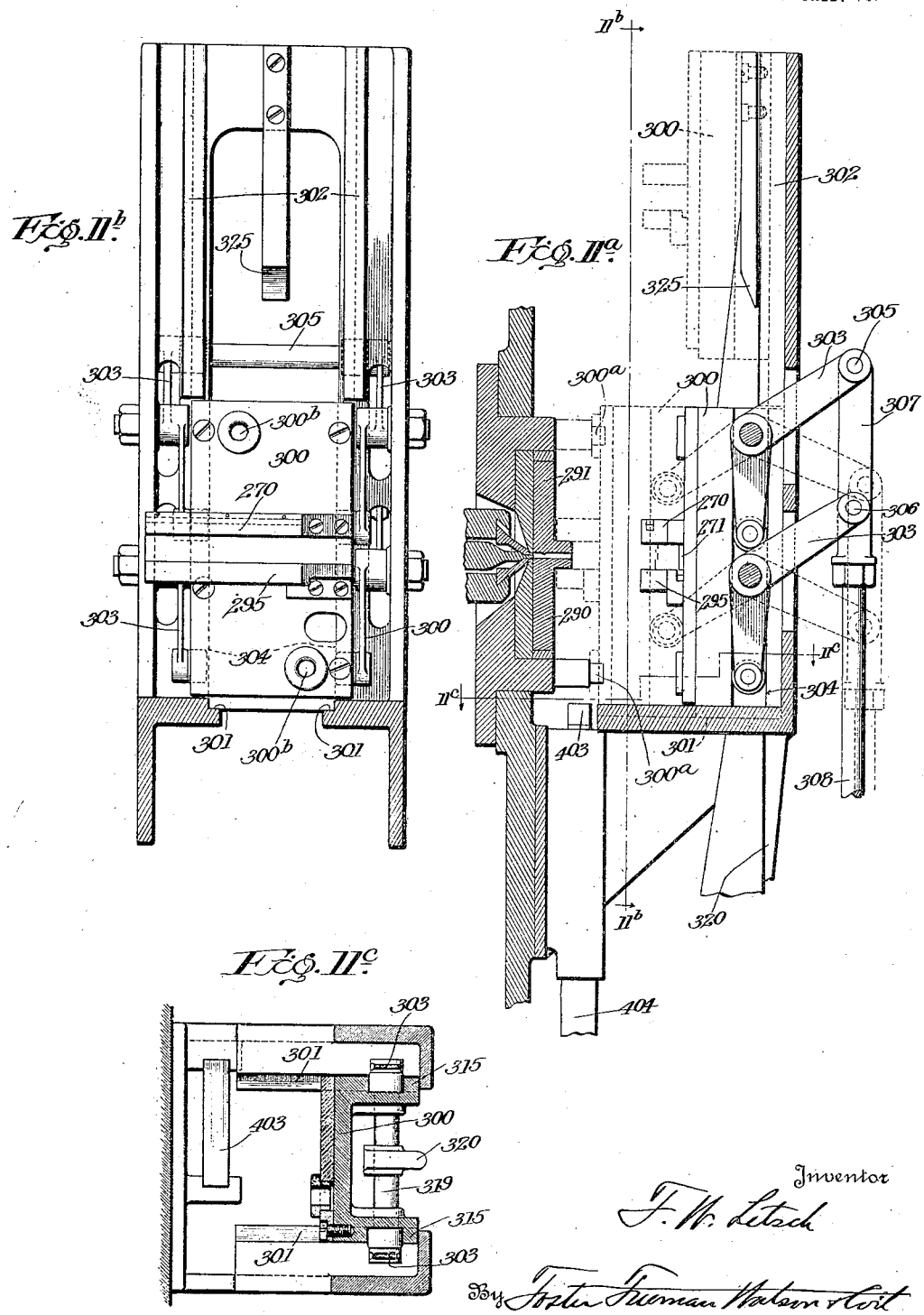

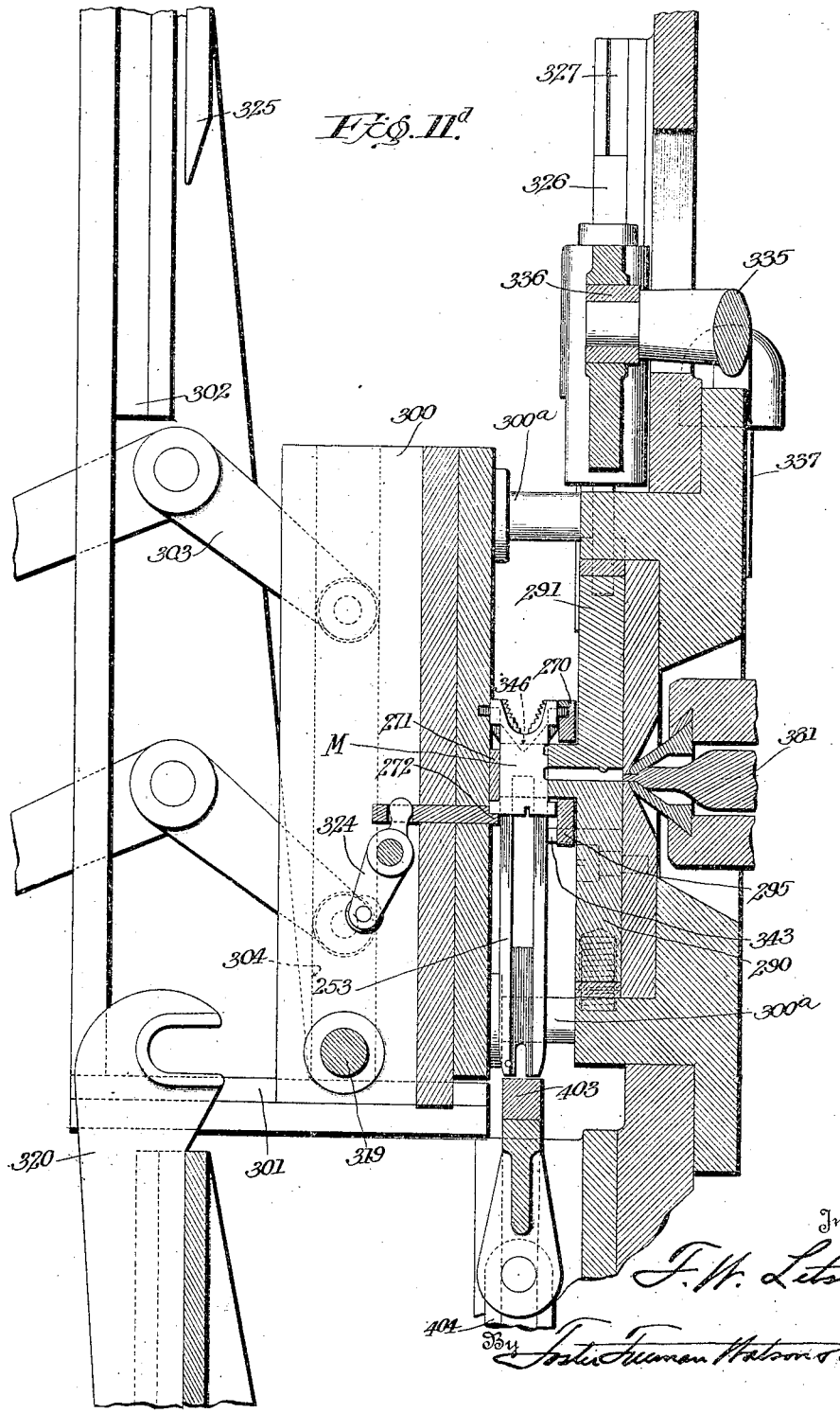

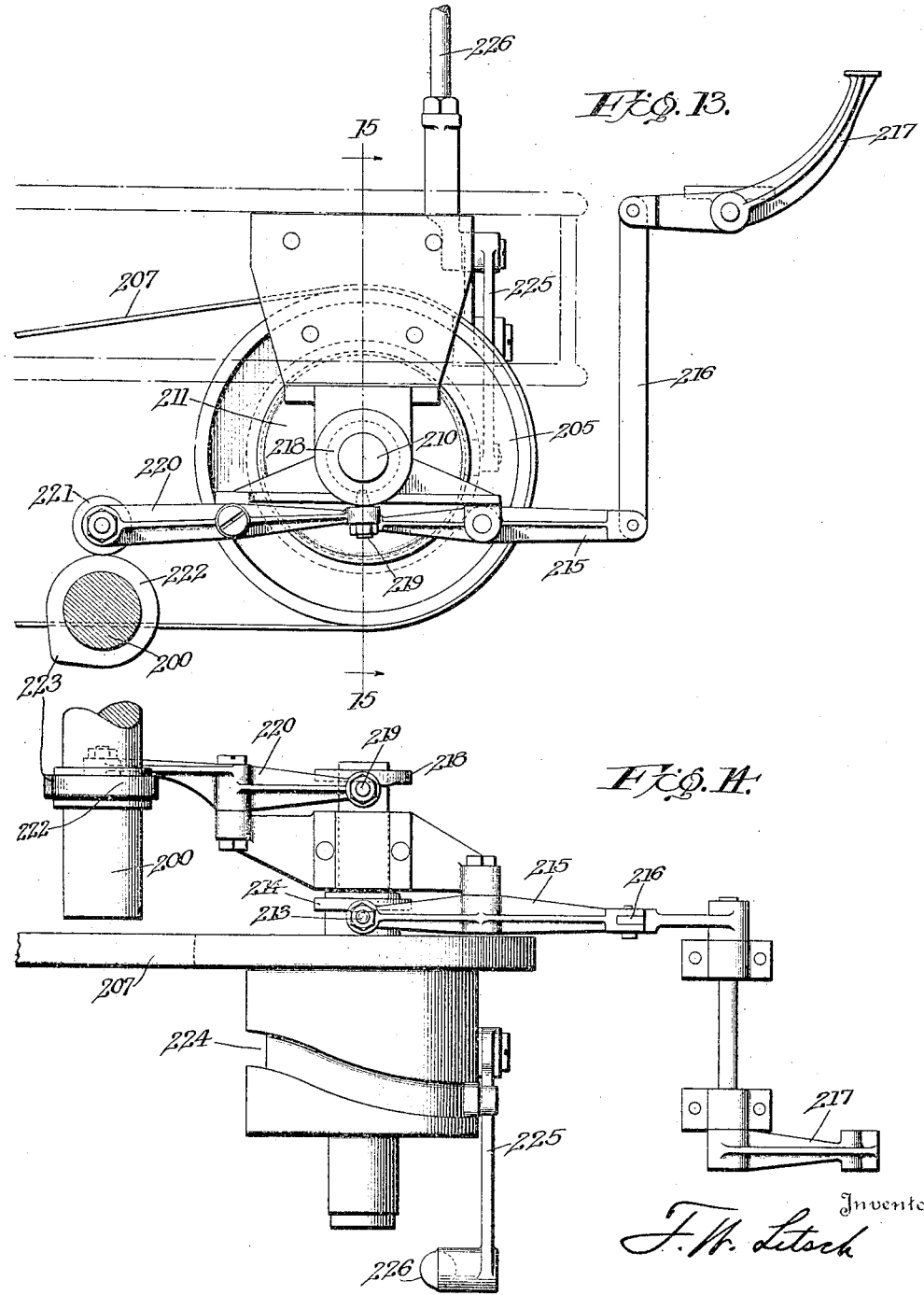

F. W. LETSCH.
TYPOGRAPHIC MACHINE.
APPLICATION FILED MAR. 15, 1918.

1,381,205.

Patented June 14, 1921.
25 SHEETS—SHEET 13.

Inventor
F. W. Letsch
By Foster Freeman Watson Hoit
Attorney

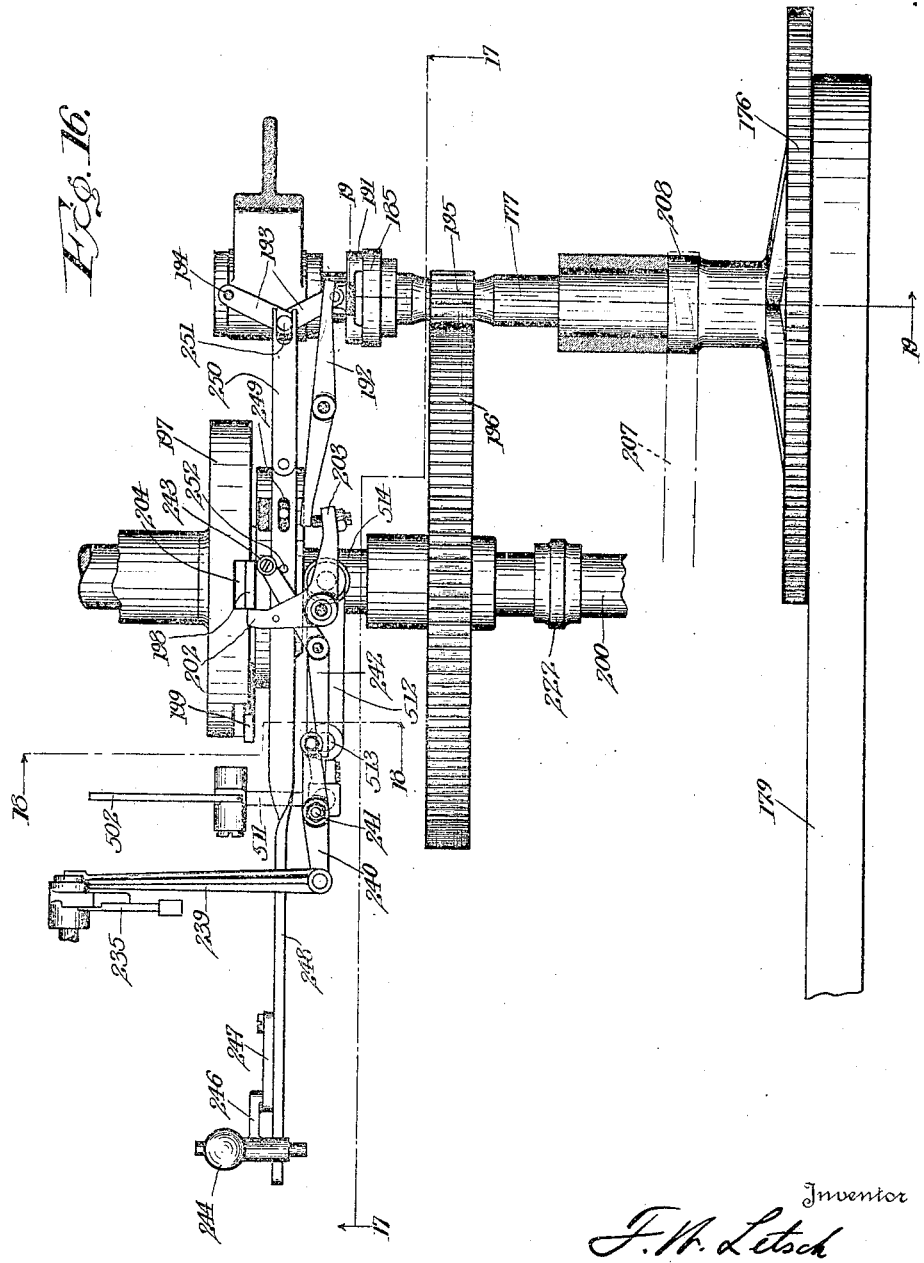

F. W. LETSCH.
TYPOGRAPHIC MACHINE.
APPLICATION FILED MAR. 15, 1918.
1,381,205.
Patented June 14, 1921.
25 SHEETS—SHEET 15.
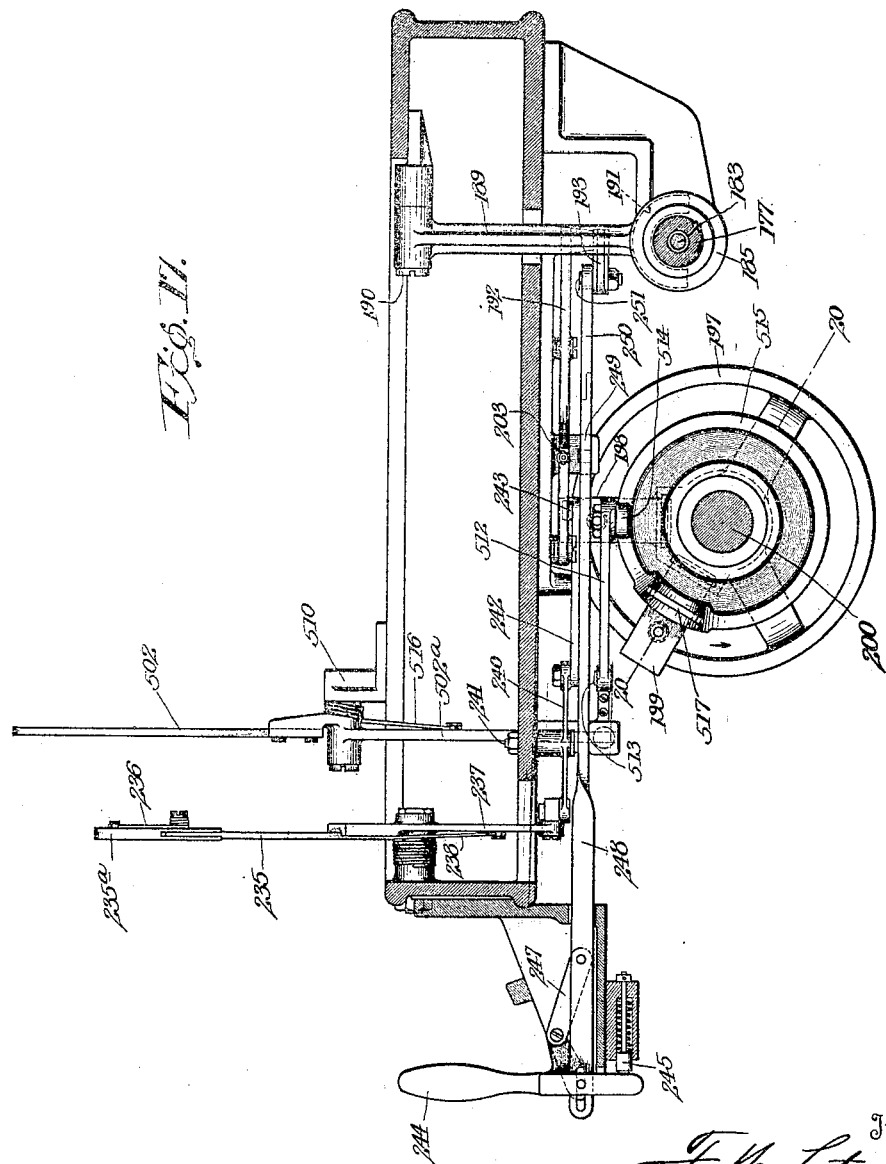

F. W. LETSCH.
TYPOGRAPHIC MACHINE.
APPLICATION FILED MAR. 15, 1918.

1,381,205.

Patented June 14, 1921.
25 SHEETS—SHEET 16.

Inventor
F. W. Letsch

By Foster Freeman Watson Heil
Attorney

F. W. LETSCH.
TYPOGRAPHIC MACHINE.
APPLICATION FILED MAR. 15, 1918.
1,381,205.
Patented June 14, 1921.
25 SHEETS—SHEET 17.
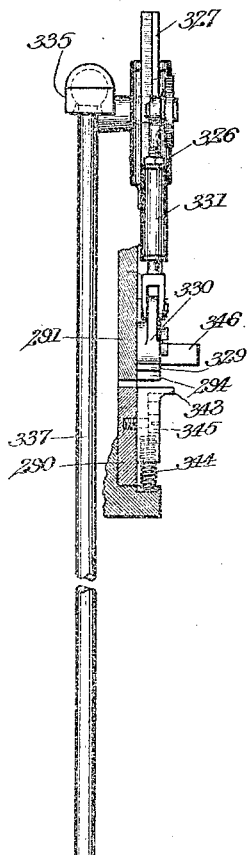
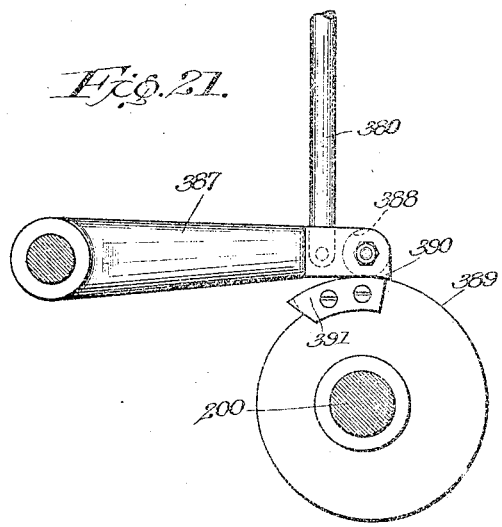
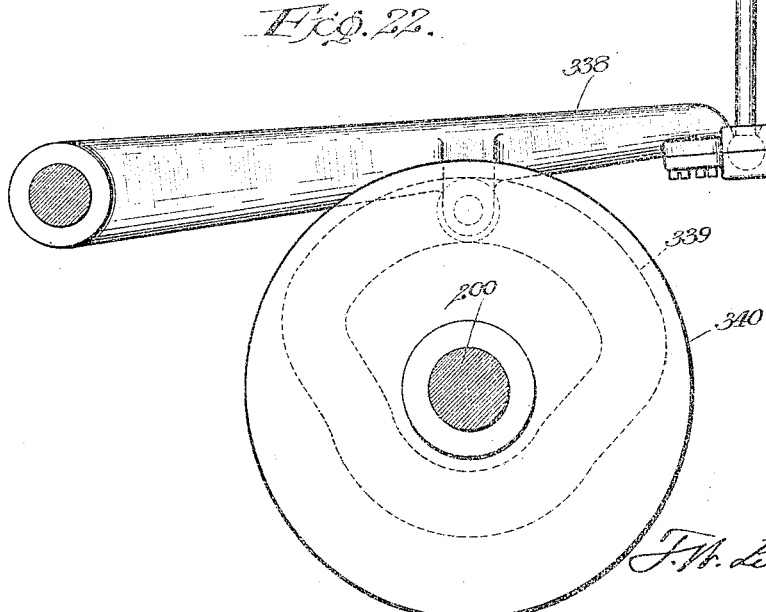

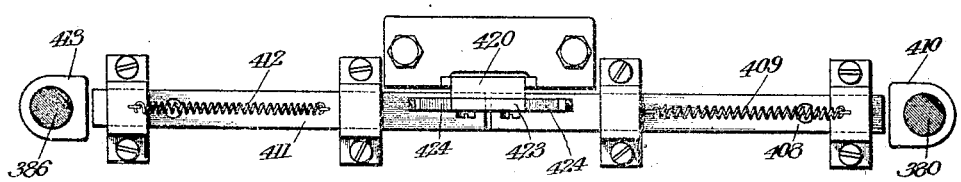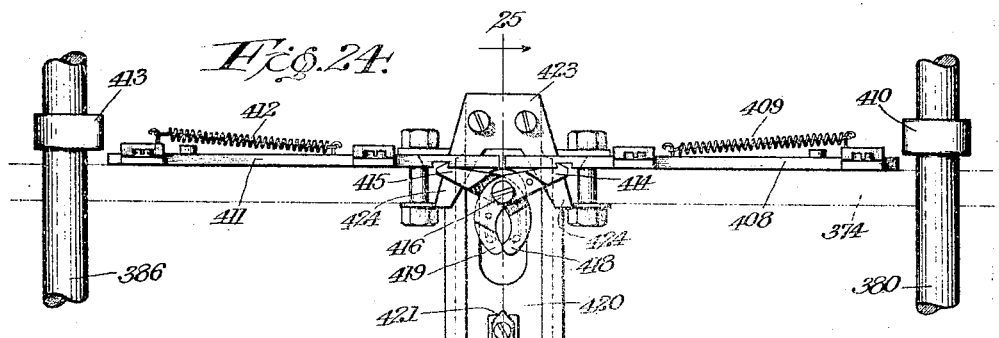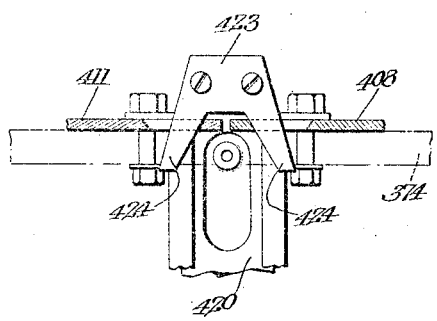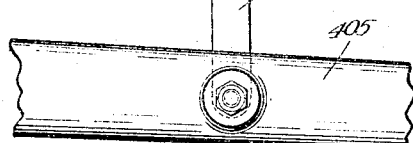

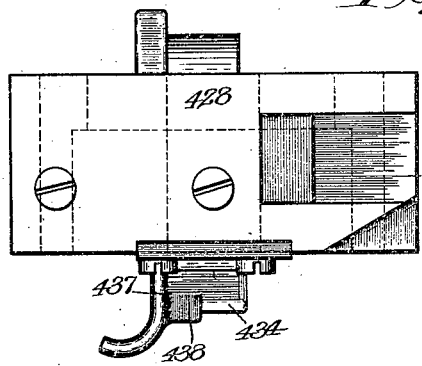
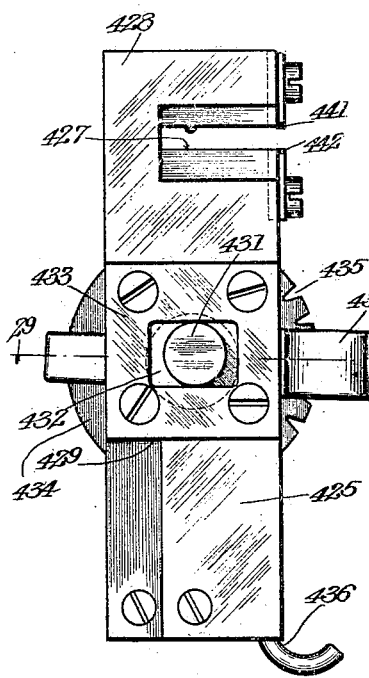
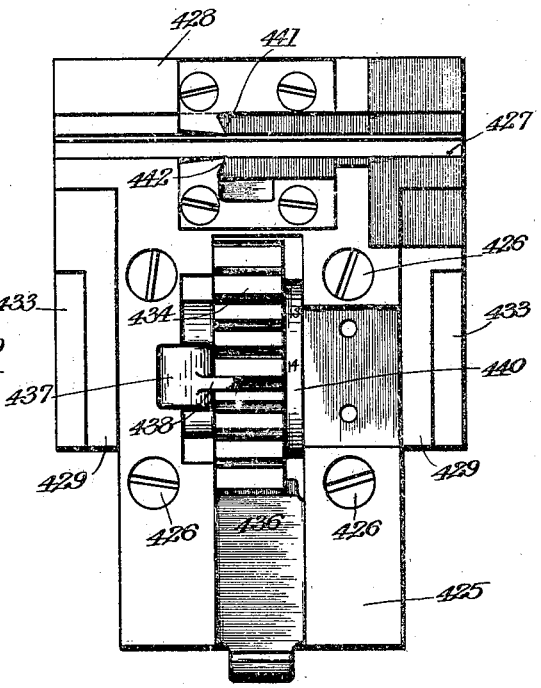

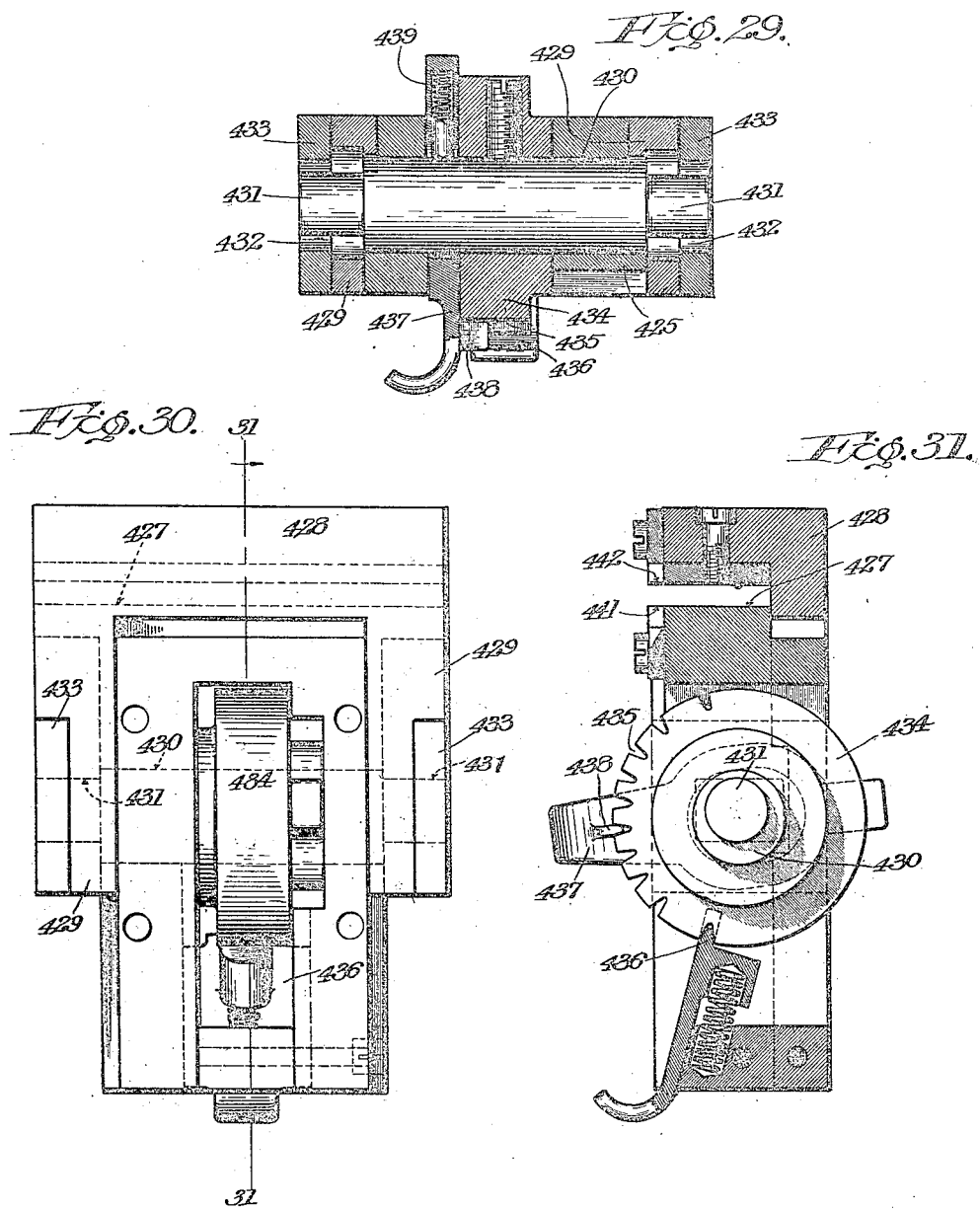

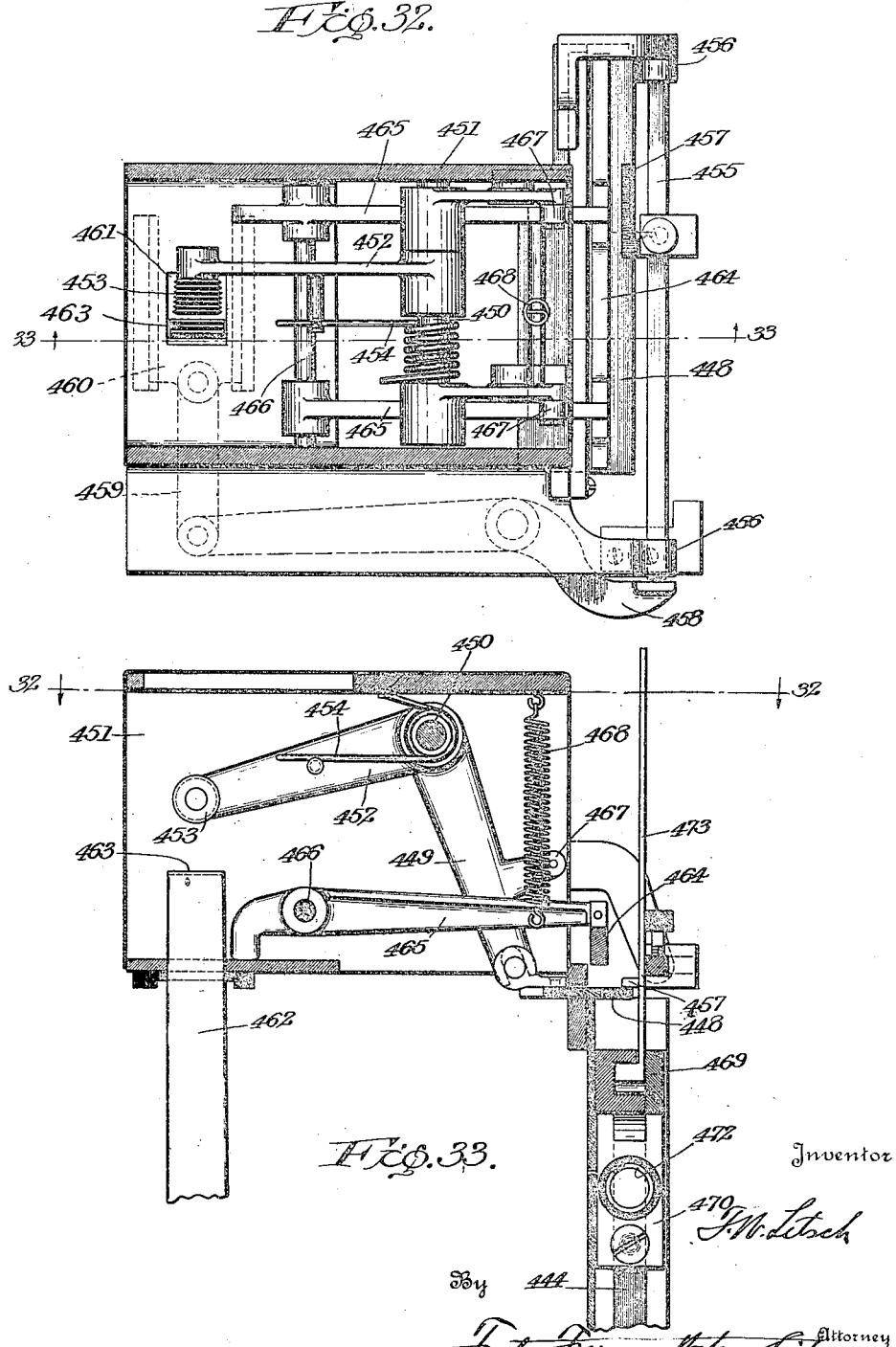

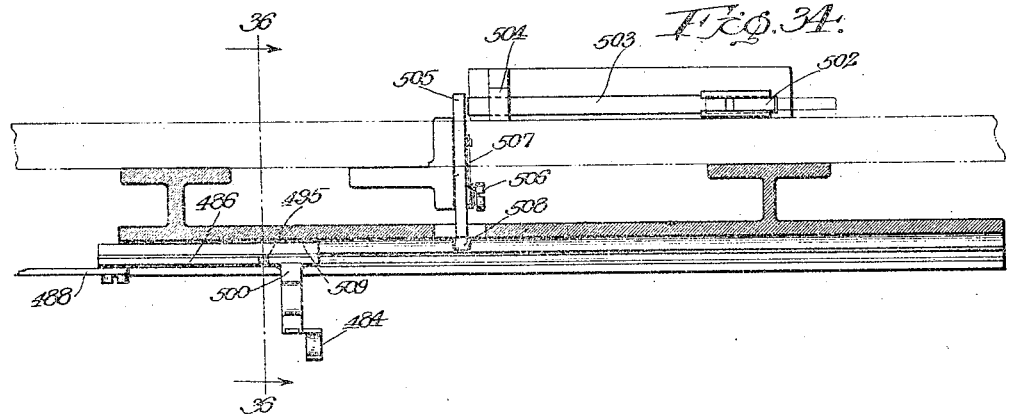
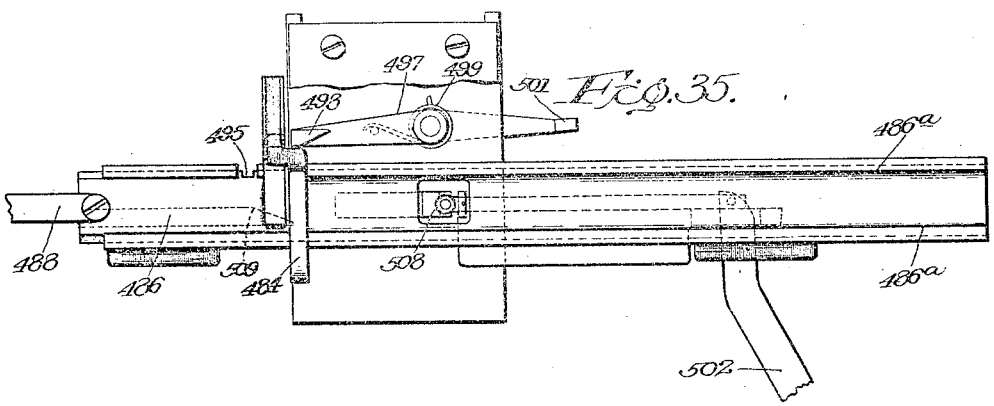
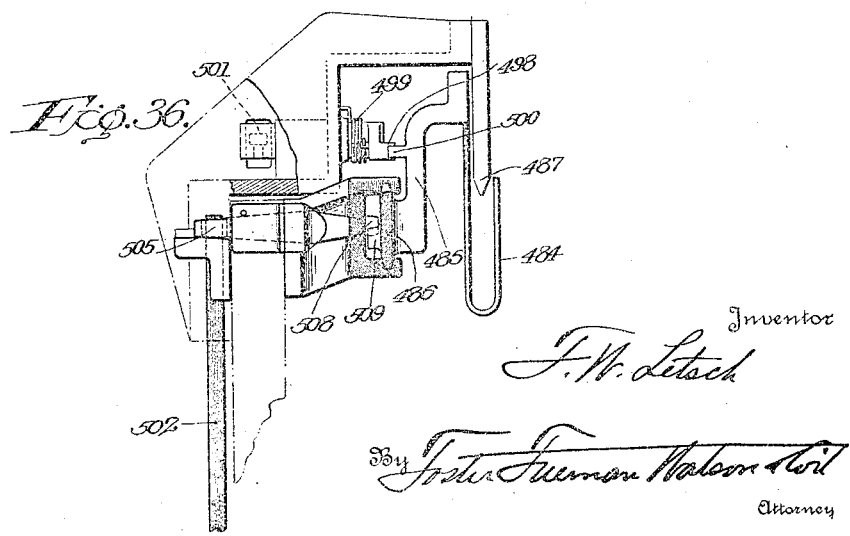

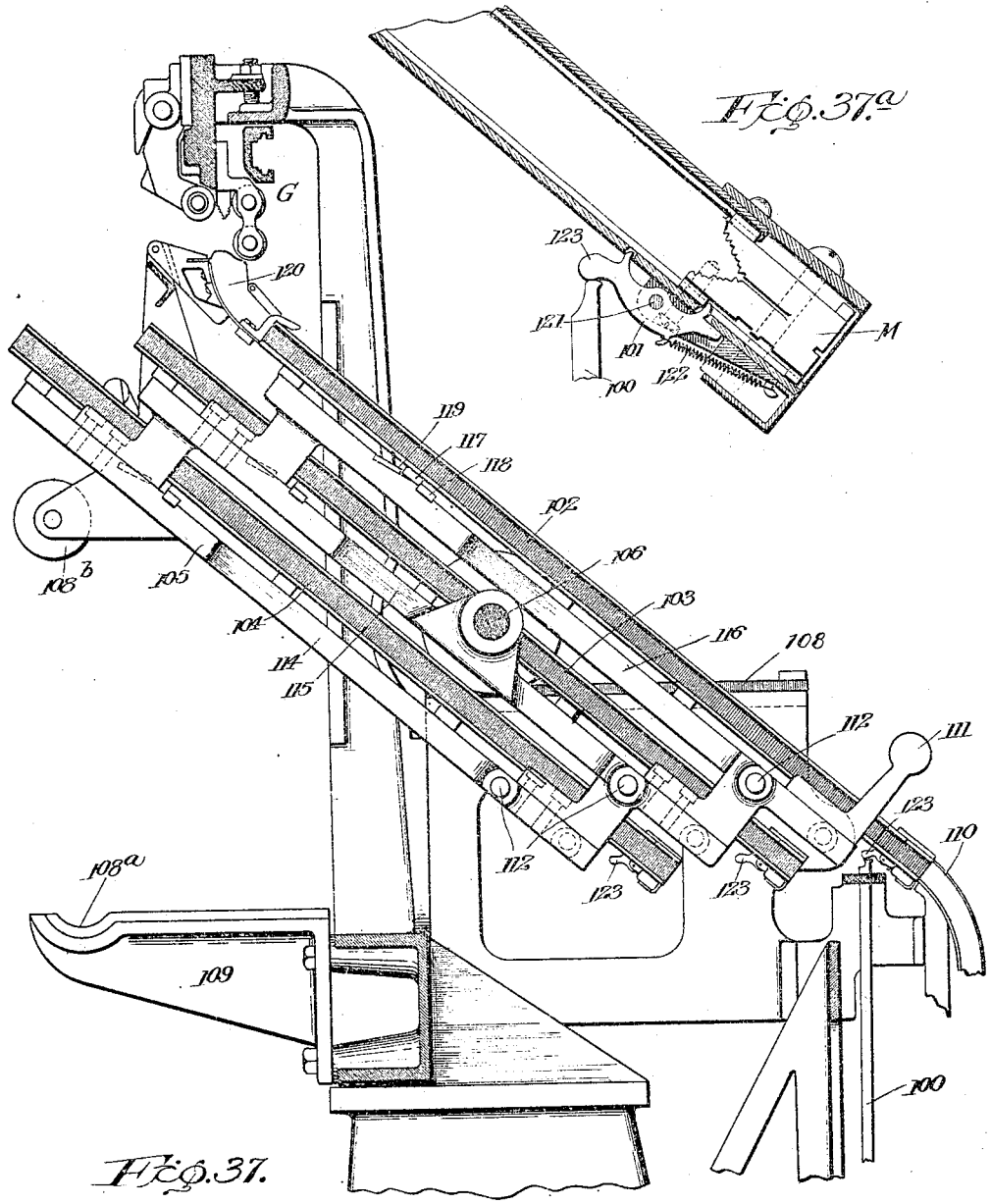

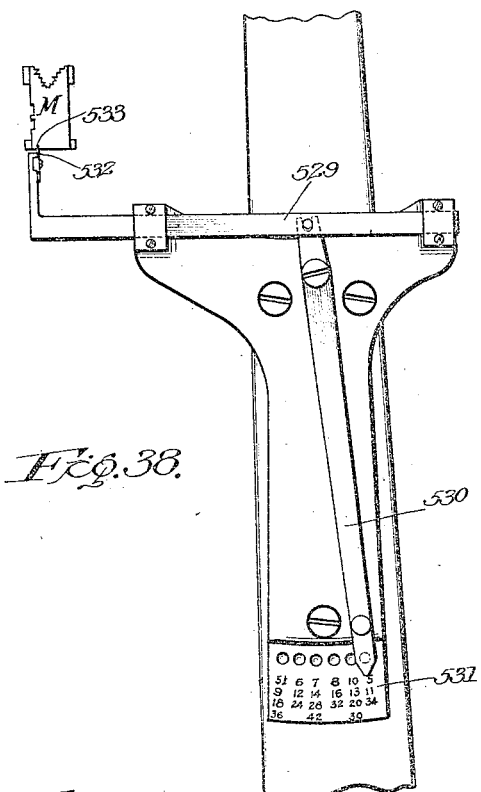
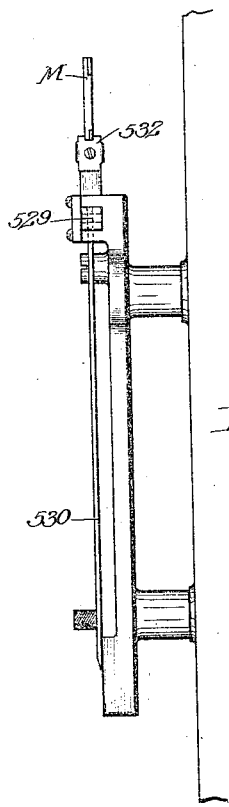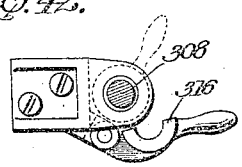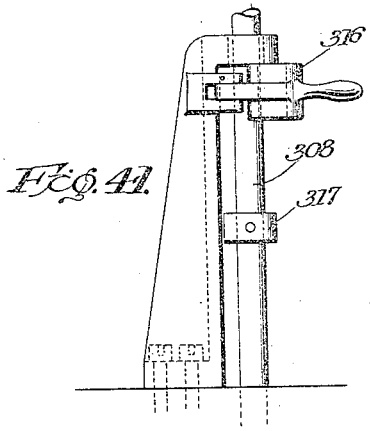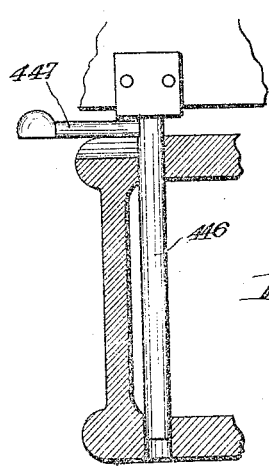

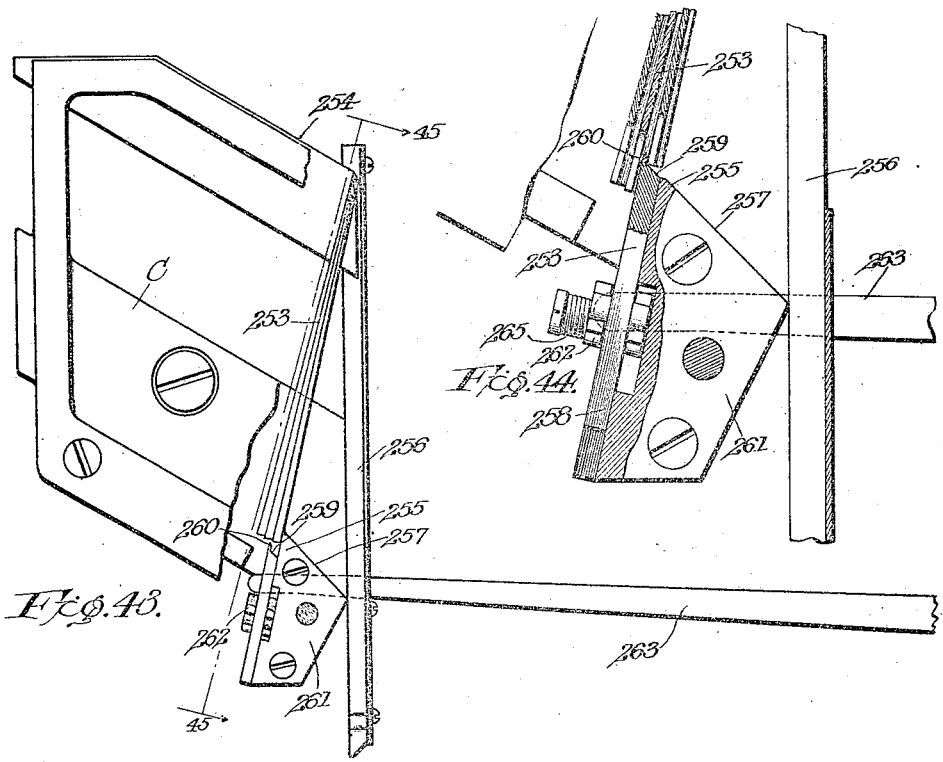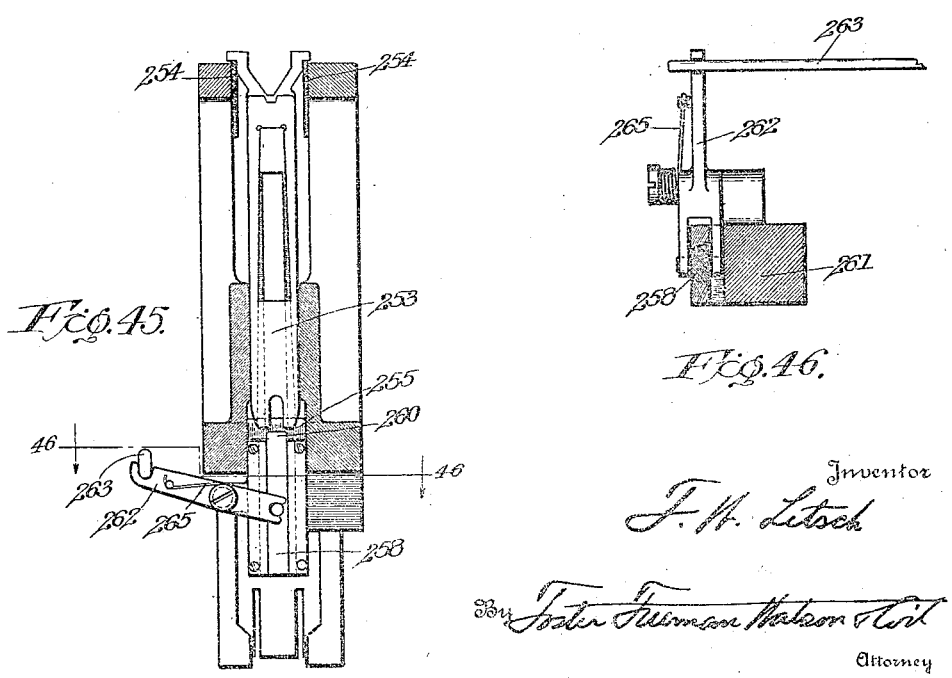

UNITED STATES PATENT OFFICE.

FREDERICK W. LETSCH, OF BALTIMORE, MARYLAND.

TYPOGRAPHIC MACHINE.

1,381,205.  Specification of Letters Patent.  Patented June 14, 1921.

Application filed March 15, 1918. Serial No. 222,760.

*To all whom it may concern:*

Be it known that I, FREDERICK W. LETSCH, a citizen of the United States, and resident of the city of Baltimore, State of Maryland, have invented certain new and useful Improvements in Typographic Machines, of which the following is a specification.

This invention relates to improvements in typographic machines and more particularly to machines in which circulating matrices are used which are assembled into lines and transferred to a mold and then redistributed to a magazine after a cast impression has been taken at the mold. The invention comprises numerous improvements in such machines with the objects of simplifying the mechanism, speeding up the operations, and adapting the mechanism to produce a greater variety of product than has heretofore been possible with linotype and similar machines.

The invention will be described in connection with the accompanying drawings, in which:—

Figure 1 is a front elevation of a machine embodying my invention;

Fig. 2 is a left side elevation:

Fig. 3 is a right side elevation;

Fig. 4 is an enlarged section of a portion of a machine taken on a vertical plane from front to rear through melting pot and mold;

Fig. 5 is a plan view and Fig. 5ª is a front elevation of the assembler slide which receives the matrices from the magazine and transfers the assembled lines of matrices to the mold, and its coöperating devices;

Figure 15:
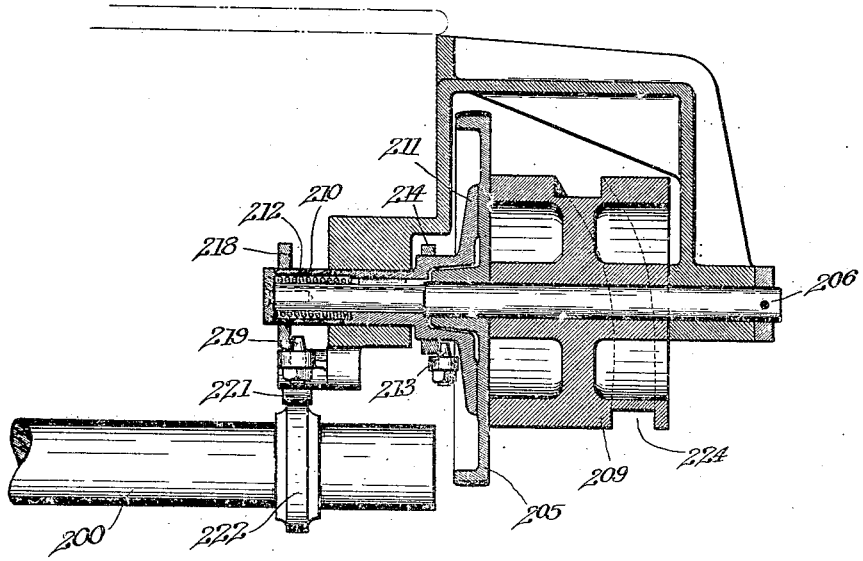
Figure 18:
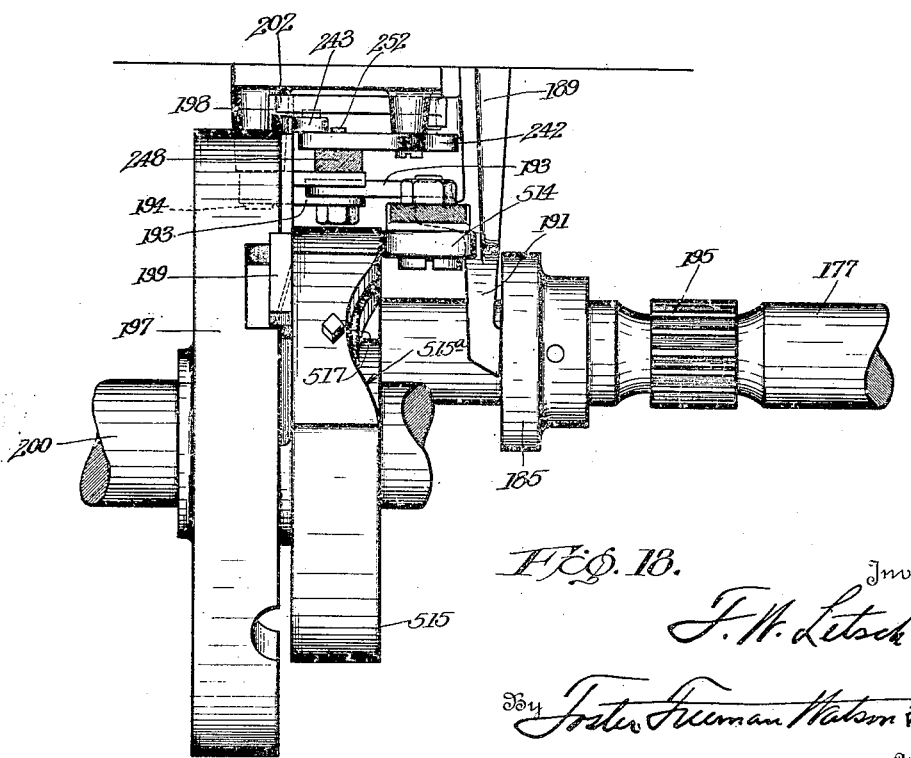

Fig. 5ᵇ is a device for adapting the machine to handle and cast single letters, logotypes or short lines;

Fig. 6 is a front elevation illustrating the mold and galley and coöperating devices, parts in front being removed;

Figs. 6ª and 6ᵇ are sections on the lines 6ª—6ª and 6ᵇ—6ᵇ of Fig. 6;

Figs. 7, 8, 9 and 10 are sections on the lines 7—7, 8—8, 9—9 and 10—10 of Fig. 5;

Fig. 11 is a section on the line 11—11 of Fig. 4;

Fig. 11ª is an enlargement of a part of Fig. 4;

Fig. 11ᵇ is a view from the line 11ᵇ—11ᵇ of Fig. 11ª;

Fig. 11ᶜ is a section on the line 11ᶜ—11ᶜ of Fig. 11ª;

Fig. 11ᵈ is an enlargement of parts shown in Fig. 11ª and showing line moved to mold for casting;

Fig. 12 is a detail of the matrix distributer shifter cam finger;

Fig. 13 is an elevation of the starting key of the assembler slide clutch;

Fig. 14 is a bottom plan view of the same;

Fig. 15 is a section on the line 15—15 of Fig. 13;

Fig. 16 is a plan view of the main clutch and automatic starting mechanism;

Figs. 17, 18, 19 and 20 are sections on the lines 17—17, 18—18, 19—19, 20—20, of Figs. 16 and 17;

Fig. 21 is a detail of the pump operating cam and connections;

Fig. 22 is a similar detail of the mold closing and locking cam and connections;

Fig. 23 is a plan, and Fig. 24 is an elevation of the safety device to prevent action of the pump should a loose line of matrices be presented to the mold;

Fig. 25 is a section on the line 25—25 of Fig. 24;

Fig. 25ª is a section on the line 25ª—25ª of Fig. 25;

Fig. 26 is a plan, Fig. 27 a left side view, and Fig. 28 is a front view of the knife block for trimming any fins or burs, due to imperfect matrices, from the slugs;

Fig. 29 is a section on the line 29—29 of Fig. 27;

Fig. 30 is a rear view of the knife block;

Fig. 31 is a section on the line 31—31 of Fig. 30;

Fig. 32 is a horizontal section showing the galley mechanism in plan view, taken on the line 32—32 of Fig. 33;

Fig. 33 is a vertical section through the same mechanism on the line 33—33 of Fig. 32;

Fig. 34 is a plan and Fig. 35 an elevation of the matrix and space-band shifter;

Fig. 36 is a section on the line 36—36 of Fig. 34;

Fig. 37 is a left side view of the multiple magazine illustrating a means for shifting from one magazine to another;

Fig. 37ª is a detail of the escape pawls;

Fig. 38 is a face view of the font distinguisher which is located at the left of the magazine;

Fig. 39 is an edge or front view of the same;

Fig. 40 shows a detail of the galley lock, illustrated also in Fig. 6;

Figs. 41 and 42 are side and plan views of the device for preventing distribution of the matrices when casting duplicate slugs;

Fig. 43 is a front view, partly broken away, of the space-band magazine, illustrating the method of releasing the space-bands from the magazine;

Fig. 44 is a sectional view of the same; and

Fig. 45 is a section on the line 45—45 of Fig. 43;

Fig. 46 is a section on the line 46—46 of Fig. 45.

The machine in general is of the type shown in patent to Mergenthaler, #436,532, September 16, 1890, and in the drawings and in the following specification, certain features which are old and well-known will be but briefly referred to, such features having been illustrated only in so far as they are necessary to an understanding of the present improvements.

Referring to the drawings, A indicates the usual key-board, B the matrix magazine, C the space-band holder or magazine, D (Fig. 6) the mold, and E the galley.

The connections between the keys of the key-board and the rods 100 which coöperate with the matrix release pawls 101, may be of any suitable character such, for instance, as shown in said Mergenthaler patent, and they need not be illustrated or described in the present application. The release pawls 101 will be referred to later on in connection with the magazine details.

The multiple magazine B, as shown in Figs. 2, 3 and 37, comprises three magazines 102, 103, 104, removably mounted in a suitable magazine frame 105. The frame is provided with trunnions 106 near its center of gravity upon which are rollers 107 running on tracks 108 at each side of the machine. The magazines and their carrying frame are slightly heavier in the rear of the trunnions than in front so that the frame, when not locked in operative position, has a tendency to rotate upon its trunnions until a wheel 108$^b$ carried by a bracket on the rear of the frame rests in a socket 108$^a$ upon a bracket 109 on the rear of the machine frame F. When in this position, the magazines may be readily lifted out and replaced by an operator at the rear of the machine.

The magazine frame is manipulated to carry it forward and backward on the tracks 108, to bring one or other of the magazines into register with the assembler chutes 110, by a suitable handle 111. Before shifting the magazines the forward end is raised, tilting them upon the trunnions 106, so as to free the operative magazine from the escapement rods 100 and from the assembler chutes. The magazine frame is shifted backward or forward and the desired magazine is brought into register with the assembler chutes by means of pins 112 on the magazine frame which engages notches 113 in plates fixed on the frame of the machine (Figs. 1, 2, 3 and 37).

The magazine frame is built up of three sections 114, 115, 116, each supporting a magazine at its front and rear ends. The rear end of each magazine has connected with it a transverse bar 117, which engages a bar 118 to prevent the magazine from sliding forward and which also engages a bar 119 to prevent the magazine from sliding rearward when the frame is tilted to the rear.

The distributing mechanism G may be that used in the linotype machine. A single distributer is used dropping the matrices into their chutes 120. It will be understood that when any particular magazine has its lower end adjusted to register with the assembler chutes 110, its upper end will register with the proper chutes 120 of the distributing mechanism, as shown in Figs. 2 and 37.

Referring to Figs. 37 and 37$^a$, the pawls 101 rock upon pins or rods 121 carried by the respective magazines. Each pawl has a spring 122 which normally holds its lower finger in engagement with the lowest matrix M and a tail piece or projection 123 which is above and in register with the corresponding escapement rod 100. The operation of the escapement rods and pawls is the same as in the usual linotype construction.

It will be understood from the foregoing description that any one of the magazines may be brought to operative position instantly simply by tilting the magazine frame, which is practically balanced upon its trunnions 106 and rolling it forward or backward on the tracks 108 to locate the proper magazine in operative position with respect to the distributer and the assembler. A bolt 124, which coöperates with holes in the magazine frame is preferably used to lock the frame with one or other of the magazines in operative position. It will also be understood that when the magazine frame is tilted backward to bring the roller 108$^b$ into the notch or pocket 108$^a$, any one of the magazines may be lifted out and another magazine substituted, it being only necessary to raise the magazine and its parts over the bars 118 and 119.

*Assembler slide.*

The matrices are conveyed to an assembler slide by the usual inclined belt 125 (Fig. 1)

and the slide carries the lines successively to the mold. The assembler slide is illustrated particularly in Figs. 5 to 11 inclusive. The assembler slide 126 carries a flanged roller 127 which travels on a fixed rail 128 and two spaced lugs 129 and 130 which engage a second fixed rail 131 (Figs. 5 and 8). The right-hand and initial or normal position of the assembler slide is that shown in Figs. 5 and 5ª in which abutment 132 stands against a brake lever 133. The abutment 132 is fixed upon a brake rail 134 which is carried by the brackets on the slide 126. The brake lever 133 is pivoted on a fixed stud 135 and its brake shoe 136 is normally pressed against the brake rail by a spring 137. The brake relief lever 138 pivoted on the stud 135 has a limited movement due to the fixed pin 139 passing through the slot in the lever when the assembler slide 126 moves to the left, as hereinafter described. The inclined forward end of the abutment 132 strikes an incline 140 on the lever 138 forcing the upper edge of the lever under a spring clip 141 which holds the lever up and relieves the pressure of the brake shoe upon the brake bar 134 until the abutment 132 again strikes the brake lever and frees the lever 138 from the clip 141. The brake shoe 136 may also be raised from the brake bar 134 by pressing the rear end 142 of the brake lever which is provided with a fixed stop 143.

The matrices are delivered from the belt 135 over the chute 146 in front of a constantly revolving star wheel 147 (Figs. 5, 5ª and 6). The star wheel may be operated by gearing from the lower pulley which carries the belt 125, as indicated in dotted lines in Fig. 5ª, or otherwise. The delivery of matrices from the magazine to a position in front of the star wheel may be the same as in the ordinary linotype machine and does not constitute a part of the present invention.

The matrices are delivered by the star wheel against a finger 148 carried by the assembler slide 126 and as the successive matrices are assembled the slide is moved to the left by the action of the star wheel and under control of the brake 136. The finger 148, as shown in Figs. 5 and 7, is carried by the sleeve 149 pivoted on a stud 150 which is fixed on the assembler slide 126. A coiled spring 151 tends to throw the finger 148 into a position parallel with the movement of the assembler slide to free the matrices, but during the assembling of a line of matrices the finger is latched against the action of the spring by a latch 152 carried by a lever 153 (Figs. 5ª and 7), which is pivoted at 154 and normally pressed upward by a spring 155. When the assembler slide is moved to the left to discharge a line of matrices in front of the mold, the inclined forward end of lever 153 strikes the lug 154ª (Fig. 11) and the latch 152 is withdrawn permitting the spring 151 to throw the finger 148 around out of the way of the matrices, permitting the assembled line of matrices to be discharged in front of the mold, as will be hereinafter more particularly described. When the assembler slide is moved to the right again, an arm 155ª (Figs. 5 and 7) strikes an abutment 156 and restores the finger 148 to its normal position, as shown in Fig. 5, whereupon it is latched in this position by the latch or bolt 152.

When a line of matrices has been assembled, a second finger springs up in rear of the line, tangent to the periphery of the star wheel to hold the line, in conjunction with the finger 48, and carry it to the mold.

The rear finger 157 (Figs. 5 to 7 inc.) is in the form of a slide moving vertically in a guide in the forward end of block 158 which is adjustably mounted on the assembler slide 126. The finger 157 is sustained by the forward end of the lever 159, which is pivoted to the block 160. The finger 157 has a pin 161 which engages a notch in the lever 159. The lever 159 has a constant tendency to rise, and to raise the finger 157 under the influence of a spring 162. When the assembler slide is in its right-hand position, as shown in Figs. 5 and 5ª, the lever 159 is held down in horizontal position by a roller 163 mounted on an adjustable bracket 164, the roller engaging a flange 165 on the bottom of the lever (Fig. 8). The roller 163 holds the finger 157 below the bottom line of the matrices as they are assembled. As the line of matrices grows the assembler slide is moved to the left as previously described and as the line is completed the roller 163 passes off of the flange 165, freeing the lever 159, which springs up, carrying the rear finger 157, the upper end of which is tapered, upward between the star wheel and the last matrix in the line. The line is thus confined between the forward finger 148 and the rear finger 157.

The block 158 is adjustable on the assembler slide 126 to adjust the finger 157 for different lengths of lines. As shown in Figs. 5ª, 9 and 10, the adjustment is accomplished by means of a series of notches 166 in a plate 167 attached to the assembler slide 126 and a coöperating bolt 168 in the block 158, the block 158 being connected to the assembler slide 126 by a dove-tailed engagement with the notched bar 167, as shown in Fig. 9. The bolt 168 is urged into engagement with the notched plate 167 by a spring 169, and may be disengaged by a knob 170. Notches 166 may be of any desired scale as for instance 1 em or ½ em in width.

After a line of matrices has been delivered by the assembler slide to a position opposite the mold, the slide is restored to its normal position, as shown in Figs. 5 and 5ª. On the return movement of the slide a roller 171 carried by the lever 159 engages the underside of an inclined trackway 172 and the lever 159 is drawn down and reëngaged by the fixed roller 163. The upper portion 172ª of lever 172 is pivoted so that it may swing downward to permit the roller 171 to pass to the left and it is normally held in line with the fixed portion 172 by a spring 173.

Starting mechanism.

Before describing the means for moving the assembler slide from the assembling position to the mold, I will describe the means for operating the machine by power. It is to be understood that all parts of the machine are to be operated automatically excepting the keys and the starting lever to be hereinafter referred to.

Figure 19:
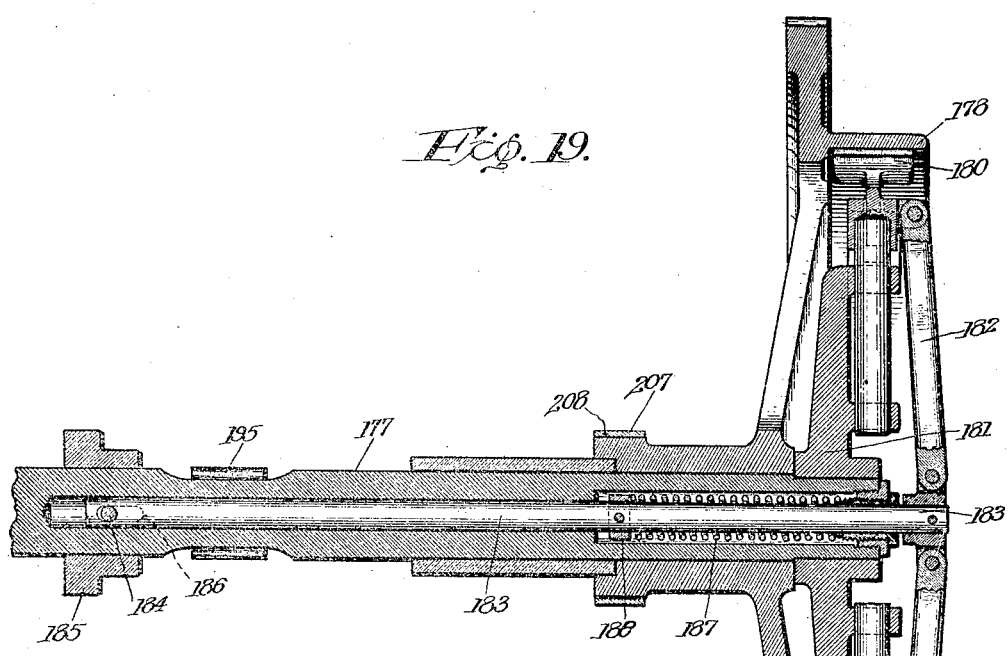
Figure 20:
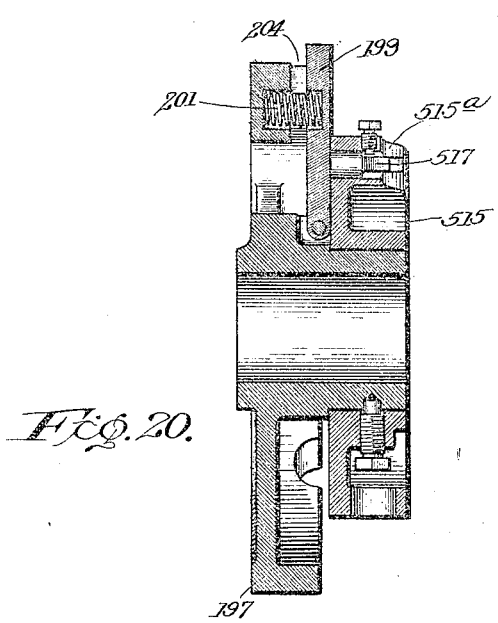

Referring to Fig. 3, 174 indicates an electric motor on the armature shaft of which is a pinion 175 in mesh with a large gear 176 which is normally free to turn loosely on a clutch shaft 177 (Figs. 16 and 19). The clutch 178 extends outwardly from one side of the gear 176, its outer surface serving as a pulley for the belt 179 which drives the distributer and other parts of the machine, its inner surface being adapted to coöperate with the clutch shoes 180 which are carried by a frame or spider 181 fast on the end of the shaft 177. The shoes 180 are connected to toggle links 182, the inner ends of which are pivotally connected to a rod 183 extending centrally through the shaft 177 and having its inner end connected by a pin 184 to a collar 185 sliding on the shaft 177. The pin 184 extends through slots 186 in said shaft. A spring 187 pressing on a collar 188 fast on the rod 183 tends constantly to pull the toggle links 182 into alinement to force the clutch shoes 180 into engagement with the flange of the constantly running gear 176. The clutch shoes are normally disengaged from the gear 176, however, by means which will be presently described.

Referring to Figs. 16 and 17, 189 indicates a depending arm pivoted to the frame of the machine at 190 and having at its lower end a yoke 191 spanning the shaft 177 and in position to engage the collar 185. This yoke is adapted to be moved by a lever 192 to disengage the main clutch from the gear 176 and it is also adapted to be moved to disengage the clutch by toggle levers 193, which connect the pivoted arm 189 with a fixed pivot 194.

The main cam shaft 200 of the machine is driven from the shaft 177 by a pinion 195 and gear 196. On the cam shaft 200 there is a disk 197, (Figs. 16, 17 and 20), which carries a spring latch or pawl 198 which effects the automatic throwing out of the main clutch 180, and a similar spring latch 199, which may be termed an emergency latch. Each of these spring latches is normally pressed away from the disk by similar springs 201, which hold the latches out of register with the right face of the disk and in position to engage the arm 202 of an elbow lever. When the latch 198 is in its normal position, shown in Fig. 16, it will engage the arm 202 of the elbow as the cam shaft rotates and rock the arm 203 of said lever against the forward end of the lever 192, thus moving the clutch operating rod 183 out of engagement with the driving gear 176 and stopping the rotation of the clutch shaft and cam shaft. The spring 187 in the clutch shaft tends to move the levers 192 and 202 in the opposite direction and when the latch 198 is moved into its recess 204 in the disk 197, the spring and cam shaft immediately begins to rotate.

Automatic starting.

Referring to Figs. 1, 3, 13, 14 and 15, 205 indicates a pulley which is loose on a short shaft 206 and which is constantly driven by a belt 207, which engages the hub 208 of the constantly running gear 176. On the shaft 206, to the right of the pulley 205, is the cam cylinder 209 and on the left of the pulley 205 is a clutch sleeve 210 bearing a clutch disk 211, which is constantly urged toward the pulley 205 by a spring 212. When the spring 212 is free to press the clutch disk 211 against the pulley, the pulley is pressed against the cam cylinder and the clutch disk and cam cylinder rotate with the pulley. The clutch disk is normally held away from the pulley by a pin 213 operating on a cam ring 214 which is fast on the hub of the clutch disk, the pin 213 being on a lever 215, the forward end of which is connected by a link 216 with the starting lever 217 (Figs. 3 and 13). It will be noted that when the upper end of the starting lever is pressed down the pin 213 will be withdrawn from the high point of the cam 214. If the clutch disk 211 is not otherwise restrained it will spring into engagement with the pulley 205 and the cam cylinder 209 will make a complete revolution. The starting lever or key should be instantly released and its pin 213 immediately resumes position to engage the cam 214 and disengage the clutch from the pulley at the completion of a single revolution. On the inner end of the cam sleeve 210 there is a second cam ring 218 which coöperates with a pin 219 on a lever 220 to control the clutch 211 in a manner to be hereinafter explained. The opposite end of the lever 220 carries a roll 221 which runs on a cam 222 on the main cam shaft 200. The cam 222 is circular, with the exception of a high point 223. The control of the clutch 211 is effected in the following manner: Should the starting lever 217 be pressed before the cam shaft 200 has completed its cycle or before the presentation slide 300, hereinafter described, reaches correct position to receive the assembled line, the high point 223 on cam 222 which is fastened on cam shaft 200 will not have reached a position to release the pin 219 (Fig. 4) from the cam ring 218, the high point of this cam ring 218 as shown in the drawing being timed to be a trifle later in action than that of cam ring 214. Thus it will be seen that if lever 217 is pressed prematurely, that is, before the cam shaft 200 has come to a normal stop, the clutch disk 211 will be restrained by action of pin 219 which will allow the transfer slide to move but a short distance, at which point it will be held until the high point 223 on cam 222 disengages the pin 219 from cam ring 218. When this point has been reached the slide will automatically move forward toward the mold position and complete its movement.

Referring to Fig. 1, the delivery slide 126 is moved to the left to deliver a line of matrices to the mold, and returned to its normal position upon depressing the starting key by the following means: The cam slot 224 in the cam cylinder 209 rocks the elbow lever 225 to draw down and then raise the link 226. The upper end of link 226 is connected with one arm of an elbow lever 227, the opposite arm of which engages the slot 228 in a lever 229. The link 230 connects the free end of the lever 229 with the delivery slide 126. A spring 231 engaging the lower arm of the lever 227 constantly tends to pull this arm to the right and this tension is transmitted through the link 230 to the delivery slide 126, which holds the matrices being assembled yieldingly against the star wheel, keeping them on their feet and preventing looseness in the assembled line. The cam 224 has a wide portion 232 which permits the spring 231 to act during the assembling of a line, that is, it permits movement of the elbow lever 225 and its connections while the matrices are being assembled. Preferably, the connections between the cam 209 and the delivery slide 126 are provided with one or more safety joints. As shown in Figs. 1 and 5, the joints between the link 230 and the slide 126, is formed by an open eye in the link and a spring 233 which retains a pin in the opening. The link 230 thus becomes automatically disconnected from the slide 126, if the slide meets with any obstruction during its movement to the right. A similar joint between the link 226 and the lever 227 becomes disconnected if the slide encounters any abnormal obstruction during its movement to the left.

The mechanism just described moves the delivery slide to the left and delivers a line of matrices into position opposite the mold and then returns the slide to its right-hand or receiving position, in response to the starting key. As the delivery slide moves to the right, a projection 234 (Fig. 7), engages the upper end of the automatic starting lever 235 and moves the lever to the right, effecting the automatic starting of the cam shaft, as will be presently explained. The upper end of the automatic starting lever has a jointed portion 235ª which is normally maintained in line with the lever by a spring 236 but which will yield and permit the delivery slide to move to the left without moving the lever. Referring to Figs. 1, 16 and 17, the lever 235 has a downwardly projecting arm 237 and a coiled spring 238 connected to this arm holds the lever normally in the position shown in Fig. 1 and returns it to this position when it is moved by the delivery slide. The arm 237 is connected by a link 239 with a rocker 240 pivoted at 241. The free end of the rocker 240 engages one arm of a lever 242 and the other arm of this lever carries a roller 243, which is adapted to engage the pawl 198 and move it into its recess, freeing the lever 202 and thus starting the cam shaft 200, as heretofore explained.

It is sometimes desirable to start the cam shaft by hand and at other times desirable to lock the starting clutch, so that the cam shaft cannot be started automatically. Means are provided for these processes as follows:

Referring to Figs. 1, 16 and 17, 244 indicates a lever pivoted in a bracket extending forward from the main frame. The lever is normally held in the vertical position by a spring plunger 245. An arm 246 of the lever 244 is connected by link 247 to a rearwardly extending rod 248. The rear end of the rod 248 lies adjacent to the cam disk 197 on shaft 200 and also adjacent to the lever 242. It is guided in its movement by a pin and slot 249, and has a jointed extension 250 which engages the pin 251 uniting the toggle levers 193. When it is desired to prevent the automatic starting of the cam shaft, the lever 244 is moved to the right which straightens the toggle levers 193 sufficiently to throw out the main clutch (Fig. 19). When it is desired to start the cam shaft by hand, the lever 244 is thrown to the left of the vertical, causing a pin 252 to swing the lever 242 against the latch 198, freeing the lever 202 and permitting the clutch shoes 180 to be thrown outward by the spring 187 (Figs. 16, 17 and 19).

It will be understood that in assembling the lines of matrices the words are separated by wedge spaces or space bands from the magazine C. The particular means for releasing the space bands is illustrated in Figs. 1 and 43 to 46 inclusive, in which 253 indicates the individual space bands which may be of the usual construction. The space bands are delivered into the magazine C with their upper ears riding on rails 254.

The lower end of the foremost space band hangs against a fixed detent 255 and when a space band is released on this detent by raising it swings into a vertical position and then drops through a chute 256, there being a sufficient opening between the lower end of the inclined rails 254 and the chute to permit the ears of the space band to travel between them. The upper face of the detent 255 is inclined, as at 257 and when the space band is released from the detent its lower end rides down this incline and into the chute. The space bands are released one at a time, as required, by a pusher 258 having an inclined upper surface 259 which alines with the incline 257 when the pusher is in its upper position. The pusher also has a slight lip or projection 260, which enters a recess in the forward side of the next to the foremost space band, insuring that the pusher will raise the foremost space band and will not disturb the next one in the rear, as shown in Fig. 44. The pusher is mounted to slide on the block 261 which owns the detent and it is operated by a rocker 262 and lever 263. The lever is centrally pivoted at 264 (Fig. 1), and its right end is connected suitably to the usual space key of the key board. The pusher is normally held in its lower position by a suitable spring 265. The means just described for releasing the space bands acts quickly and positively and the space bands drop, when released, in front of the star wheel 147 and are assembled in the same manner as the matrices in the assembler slide.

Casting mechanism.

Referring to Figs. 5 to 8 inclusive, 266 and 267 indicate rails upon which the matrices rest in the matrix chamber of the assembler slide. A supplemental rib 268 may be moved into the chamber to hold the matrices in an upper position for the purpose of casting from the lower characters of two letter matrices. The rib 268 is in the form of a slide which may be operated by a small lever 269. The matrices are transferred from the rails 266, 267 and 268 to rails 270, 271 and 272 (Figs. 4, 11 and 11$^a$), and when the assembler slide moves to the left the rear finger 157 pushes the line of matrices on to these latter rails and opposite the mold. The rails 270, 271 have holes in their ends to receive dowels 268$^a$ on the rails 267, 268 to cause the two sets of rails to register exactly when brought together. The matrix chamber with the rails 266, 267 and 268, is mounted to slide on rods 273, 274, and to be retained normally in its left hand position by a spring 275. When the matrix supporting rails of the assembler slide are intercepted by the rails of the casting mechanism, movement of the line chamber is stopped while the assembler slide 126 and the rear finger 157 continue to move forward until the line is completed and transferred to the fixed ribs or rails. The assembler slide then moves back to receive a new line and in such rearward movement it operates the starting lever heretofore referred to, and the necessary operations for casting a logotype or linotype from the assembled line of matrices take place automatically, as will be hereinafter explained.

Mold and casting mechanism.

The mold D, as shown in Figs. 4 and 6, comprises a lower fixed mold block 290, an upper mold block 291, which has a slight vertical movement, a body piece 292 in the form of a horizontal blade on a slide 293, and an end gate 294, which is vertically movable to close and open the left end of the mold.

The rails 270, 271 and 272 and the bottom guide rail 295 are carried on a presentation slide 300 (Figs. 4 and 11$^a$ to 11$^d$ inclusive), which slide moves forward and rearward upon guides or ways 301 and is also movable vertically in guide ways 302 when in its forward position to carry the matrices to the second elevator and to carry the space bands to the level of space band magazine. The slide 300 thus constitutes the first elevator. The slide 300 is moved forward and rearward by two pairs of elbow levers 303 which have downwardly projecting arms provided with rollers running in guide grooves 304 and forwardly extending arms connected to cross pins 305, 306. The pins 305 and 306 are connected by links 307 (Figs. 1, 4 and 11$^a$). The elbow levers are rocked to carry the presentation slide rearward and forward by a rod 308 connected to the forward end of a cam lever 309 (Fig. 4) operated by a cam 310 termed "down lock" cam in Fig. 1. The lever has a roller 311 bearing on the top of the cam normally pressed against the cam by a spring 312. The rod 308 has a spring link 314 of ordinary construction which is not shown. The cam shaft 200 turns through one revolution from its normal position shown in Fig. 4. The rod 308 is drawn down, the elbow levers 303 rocked and the presentation slide 300 moved over to bring the matrices against the mold, as shown in Fig. 11$^d$. The matrices are held against the mold with sufficient pressure by means of the spring 312 and the spring link 314, and they are brought into exact register with the mold by means of dowel pins 300$^a$ in the mold frame which enter openings 300$^b$ in the presentation slide 300 (Figs. 11$^a$, 11$^b$). During the dwell of the roller 311 on the lower part of the cam 310 the slug or linotype is cast and the matrices are then withdrawn from the mold to the forward position, shown in Fig. 4, in which position vertical ribs 315 on the presentation slide are in line with the station on the guide grooves 302 of the first elevator.

When it is desired to cast two or three slugs or bars from a single line of matrices, the rod 308 is prevented from rising to its full extent and the elbow levers 303 are therefore prevented from withdrawing the presentation slide sufficiently to engage it with the elevating devices. This is accomplished by interposing a pivoted block 316 in the path of a collar 317 which is fast on the rod 308 (Figs. 4, 41 and 42). The spring link 314 permits the cam lever 309 to rise without raising the rod 308 to its upper limit. On the next revolution of the cam shaft another slug or bar will be cast on the same matrices.

When the rod 308 is raised to its full extent and the presentation slide moved to the position shown in Figs. 4 and 11, a cross bar 319 at the bottom of the slide enters a recess or hook in the upper end of the slide 320 (Figs. 4, 11$^c$, 11$^d$). The elevator slide 320 is operated by a spring link 321, cam lever 322 and first elevator cam 323. As previously stated when the forward movement of the presentation slide 300 is interrupted by the stop device 316, the cross bar 319 will not be forward sufficiently to engage the hook slide 320 and the upward movement of this slide will not raise the presentation slide. When the parts are in the position shown in Fig. 4 the presentation slide will be raised in the guides 302. During the upward movement the duplex matrix slide 272 will be withdrawn by its lever 324 which will engage the incline 325 (Figs. 4 and 11$^d$), permitting all of the matrices which are elevated for casting from the lower characters to drop and rest on the rails 271. The matrices will thus all be brought to a common level suitable for transfer to the second elevator which will be hereinafter described.

The end gate 294 is moved down to close the end of the mold and is then clamped against the end of the mold, and the upper section of the mold is then clamped upon the body piece, thus securely closing the mold on all sides. These results are obtained by the following means. Referring to Figs. 4, 6 and 11, 326 indicates a slide carried on fixed guides 327. The end gate 294 is connected to the slide 326 by a link 328 so that the end gate is operated directly by this slide. The end gate clamp 329 is operated by an eccentric 330 which is turned by a spring link 331 connecting the eccentric with the left end of the slide 326. At the right end of the slide is a projection 332 which engages a plunger 333 in the mold frame and presses the same down against the mold thus clamping the upper half of the mold against the body piece. The pin or plunger 333 is normally raised to relieve the pressure on the mold by a spring 334.

The end gate slide 326 is moved up and down by a pivoted lever 335 (Fig. 6), which carries a block 336 operating in a slot in the slide 326. The lever 335 is operated by a link 337 which is connected to a cam lever 338 having a roller running in a groove 339 in a cam 340 on the shaft 200. The cam is termed "mold lock" cam (Figs. 1, 6 and 23). As shown in Fig. 6 the projection or plunger 332 is spring pressed downward by a spring 341 so that it can yield when the mold is locked. The end gate link 328 is also connected to a spring plunger which is normally held in its lowest position by a spring 342. Beneath the end gate is a vertically sliding bridge 343 (Figs. 6 and 22), which is normally pressed upward by a spring 344 and limited in its upward movement by the screw or pin 345 so that when moved to its upper position by the spring the upper surface of the bridge registers with the upper surface of the lower mold section and forms a platform over which the cast slug or bar is moved from the mold to the knife block and galley to be hereinafter described. In Fig. 22 is shown the projection 346 of the end gate which forms the left jaw or abutment against which the line of matrices is clamped during the casting operation. As the levers 335 and 338 are working in planes at right angles to each other, the rod 337 is preferably connected to them by universal joints, as shown.

The means for limiting the length of the mold opening, and hence the length of the slug or bar, is described as follows: The bar 293 is carried by a block 347 (Figs. 1, 6, 6$^a$, 6$^b$ and 11), which block slides between fixed rails 348 and 349 on a plate or bracket 350. The bar 293 has a tongue 293$^a$ which enters a slot in the block 347 and is secured therein by a screw 351. The body piece 292 has an opening which engages a rectangular lug 352 on the block 347. The rearward or right hand movement of the block and body piece, which determines the length of the mold opening and of the slug or bar, is limited by a stepped cylinder 353, shown particularly in Figs. 5, 5$^b$, and 6, and is rotated to bring any one of these steps 354 into line with a post 355 on the right end of the sliding block or head 347 by means of gears 356, sprocket chain 357 and shaft 358, which is turned by a knob 359. The lengths of lines corresponding to the steps of the cylindrical block 353 are indicated on a scale 360 attached to the shaft 358. The steps of the block may represent short lengths and in order not to multiply the number of steps extension pieces 361, such as shown in Fig. 5$^b$, may be connected to the contact piece 355. By using suitable extension pieces and a suitable graduated stepped block any length of line within the limits of the mold length may be obtained.

The setting of the stepped cylinder or block 353 also determines the maximum length of line of matrices and space bands which can be assembled, by means of a rack 540 which is in mesh with a pinion 541 on the shaft 358 (Figs. 5 and 5ª). The right end of the rack 540 has a projection 542 which intercepts the finger 157, and positions the same, when the assembler slide returns to the right to receive a new line. The length of line of matrices and the length of the mold opening are thus simultaneously determined by the stepped block and its coöperating devices.

The sliding block or head 347 stands normally in the dotted position shown in Fig. 5 and when in this position the stepped block or cylinder 353 may be adjusted as desired. Just before the matrices are moved up to the mold by the presentation slide the body piece and bar 293 are moved to the right until the contact piece 355 is against the stepped block. The space bands are then moved up, as hereinafter described, to justify the line and hold the matrices in closed contact.

The block or head 347 with the body piece are moved by means of a forked lever 362 (Figs. 1, 6 and 6ª), the upper forked end of which engages a roller 363 in the block 347 and this lever is pivoted at 364, its upper arm being jointed to its lower arm at the pivot and the two arms being maintained in alinement by a spring 365. This lever is operated by a cam 366 on the cam shaft which is termed "ejector" cam as one of its functions is to move the body piece to the left to eject the bars or slugs from the mold and carry them through the knife block and into the galley. The sliding block 347 has a shoulder 367 which abuts against the adjustable stop 368 (Fig. 6) carried by a slide 369 to limit the extreme leftward movement of the ejector slide, and thus determine the position in the galley to which the bars or slugs are to be moved. The stop slide 369 is adjustable by means of the clamping screw 370 and the adjustment is made in accordance with a suitable scale and a pointer 371.

*Melting pot and pump.*

The melting pot, the pump, the choker, and the means for operating the pump and choker in the present case are substantially the same as illustrated and described in my pending application 99,201, filed May 22, 1916, excepting in particulars hereinafter noted, and they are briefly described as follows: The melting pot 372 is mounted in a frame 373 which is suitably supported on rails 374 forming part of the main frame as shown in Figs. 4 and 11. The pump plunger 375 is carried by a rod 376 which is operated vertically by an arm 377 on a rocker 378, said rocker having an arm 379 connected to a vertical rod 380 which is suitably operated by the pump cam on the cam shaft shown in Figs. 1 and 21. A spring 397 (Fig. 4), surrounds the pump rod 376 and bears on a collar 398. The upper end of the spring is seated in an adjustable screw threaded cup 399 by means of which the tension on the pump rod may be adjusted, the cup or nut 399 being mounted in a fixed bracket 400. The upper end of the pump rod extends through the cup 399 and is threaded at 402 and provided with a nut 401, which is normally up to permit the pump to work but which may be screwed down upon the cup 399 to prevent operation of the pump when desired, as when making repairs.

The vertical rod 380 is connected to a cam arm 387 (Fig. 21). The arm 387 carries a roller 388 which runs on a spiral cam 389 on shaft 200. In order to impart to the pump plunger 375 a quick discharge movement, the cam arm 387 has an angular free end 390 which rides on plate 391 and drops quickly when these parts separate during the rotation of the cam.

The choker 381 is operated by a vertical lever 382 which is rocked by an arm 383 on rocker 384, said rocker having an arm 385 which is moved vertically by a rod 386 suitably operated by the choker cam on the cam shaft.

As shown in Fig. 4, the choker operating arm 383 has a spring pawl 392 which normally rests on an incline on the upper end of the lever 382. As the arm 383 drops, the pawl 392 moves downward suddenly rocking the lever 382 and withdrawing the choker from the nipple of the melting pot. At this moment the pump acts and injects metal into the mold and immediately thereafter the pawl 392 drops into the notch 393, permitting the choker to resume its normal position as shown in Fig. 4 under influence of the spring 394 which constantly tends to move the choker into the nipple. The arm 383 is then gradually raised by the spiral cam 389 and the spring pawl 392 swings out of the notch 393 and resumes its initial position, as shown in Fig. 4, ready for the next casting operation. The choker operating rod 386 is constantly under tension to move down by reason of the spring 395 bearing on the collar 396 (Fig. 2).

*Justification and automatic pump and choker stop devices.*

Referring to Figs. 4, 23, 24 and 25, 403 indicates a pusher for raising the space bands or justifying wedges to fill out the line of matrices just prior to casting. The pusher 403 is carried by a vertical rod 404 connected to the justifying lever 405. This lever has a rearwardly extending arm 406 upon which a spring 407 bears, the spring tending constantly to raise the pusher 403. The arm 405 bears a roll which runs in a cam groove in the justification cam shown in Fig. 1 which cam permits the lever 405 to rise at the proper time during the rotation of the cam shaft. When the assembled line of matrices and space bands is of proper length the line will be tightly clamped by the justifier between the jaw or projection 346 on the end gate slide and the end of the bar 293 which bar is positioned by the stepped device 353 (Fig. 6).

It sometimes happens that a line of matrices is transferred to the mold which is so short that the space bands will not close it when they are driven up as far as they should be. In such case the molten metal would be driven by the pump in between the matrices preventing the casting of a proper type bar and also preventing the proper justification of the matrices and space bands. To avoid accidents of this character a safety device is provided which will automatically prevent the operation of the pump and choker when a short line is sent to the mold, as follows:

Referring to Figs. 4, 23, 24 and 25, 408 indicates a bolt which is constantly under tension of the spring 409 to move into contact with the pump operating rod 380, the bolt being suitably guided and resting on the part 374 of the main frame. When the bolt springs outward it intercepts a collar 410 fast on the rod 380 and prevents the operation of the pump. A similar bolt 411 under tension of a spring 412 is adapted to intercept a collar 413 on the choker operating rod 386 and prevent the choker from operating. The bolts 408, 411 are normally retained in retracted position by hooks 414, 415, which engage notches in the bolts. These hooks or latches are mounted on a pivot 416 and urged into engagement with the bolts by a spring 417. Their lower ends 418, 419 are adjacent each other when the latches are in engagement with the bolts. A slide 420 bearing a wedge shaped device 421 is connected by a link 422 with the justification lever 405 and at each normal operation of the justification lever the wedge 421 moves upward more or less according to the depth to which the space bands are driven into the line of matrices. In all normal operations of the justifying lever the wedge 421 does not reach the arms 418, 419 on the latches and does not therefore release the bolts 408, 411. When a line too short for justification is presented to the mold, however, the justification lever will rise abnormally without driving the space bands tightly into the line and this will cause the wedge 421 to open the separate parts 418, 419 and withdraw the latches, permitting the bolts 408, 411 to spring outward while the pump and choker rods are in their upper positions. These rods will thus be intercepted and prevented from moving downward, the choker will not be withdrawn and the pump will not be operated, thus preventing metal from being injected into the loose line of matrices.

The bolts 408, 411 are withdrawn from the rods 380, 386 automatically as the justification lever 405 moves down and after the rods 380, 386 are supported in their upper positions by their respective cams. This is accomplished by the inclined surfaces on a plate 423 which is carried on the upper end of the slide 420, the inclined surfaces being on depending ears 424. These ears pass through openings in the rear edges of the bolts as clearly shown in Figs. 25, 25$^a$. When the slide 420 is moved to its lowest position the bolts are withdrawn to normal position as shown in Fig. 24 and automatically engaged by the latches 415 and 414.

*The knife block and galley mechanism.*

Immediately after a slug or bar is cast in the mold the body piece 292 is moved to the left by the lever 362 driving the slug out of the mold and through a knife block into the galley. As the slug passes through the knife block the upper and lower parts of its front or type bearing edge are trimmed by suitable knives. The knife block is adjustable to receive and trim slugs of different thickness, as will be presently explained.

Referring to Figs. 6, and 26 to 31 inclusive, 425 indicates the body of the knife block which is fixed on the frame by means of suitable screws 426. The upper edge 427 of the knife block is in the same plane with the bottom of the mold. The adjustable portion of the knife block 428 is yoke-shaped having two depending arms 429 which slide vertically on the body portion. The adjustment of the upper portion with respect to the fixed body portion is effected by means of a shaft 430 mounted in the body portion and having eccentric trunnions 431 which engage slots 432. These slots are formed in bearing pieces 433 which are rigidly connected to said arms.

Rigidly mounted on the shaft 430 is a graduated wheel 434 provided with notches 435 corresponding to different mold openings and different thicknesses of slugs. The upper jaw of the knife block is held in any desired position by engaging one of these notches with a spring locking pawl 436 and changes of adjustment are effected by means of a lever 437 which has a pawl 438 normally drawn into engagement with one or the other of the notches by a spring 439. The lever 437 has an oblong opening which permits it to be drawn out relatively to the shaft to shift it from one notch to another. By disengaging the locking pawl 436 and moving the lever 437 to bring the desired notch into position to engage the pawl 436, the upper jaw of the knife block may be adjusted to enlarge or decrease the opening between the jaws. A suitable scale 440 is provided on the wheel 434 which scale coöperates with a fixed pointer to indicate the channel between the jaws of the knife block. The knife block is provided with suitable knives 441, 442 to trim the slugs as they pass through the channel.

Adjacent the knife block is the galley E and the mechanism for operating the slugs in the galley which will be briefly described, as it is substantially the same as shown in my pending application, Ser. No. 99,201, before referred to. The galley mechanism is shown particularly in Figs. 1, 6, 32, 33 and 40. The galley proper 443 is removable vertically. Its right edge slides in a guide 444 on the main frame and its lower left corner is carried on a vertical bolt 445 on a shaft 446 which may be turned to lock the galley in place by an arm 447. To release the galley the arm is moved into a groove 447$^a$ which permits the bolt to drop free from the galley.

Sliding in the frame of the machine at the upper end of the galley is a blade 448 pivotally connected to arms 449 on a rock shaft 450 which is journaled in the sides of the box or casing 451. The shaft 450 carries a rearwardly extending arm 452 which has a grooved projecting roller 453. The shaft 450 is normally held in position to maintain the blade 448 in the position shown in Fig. 33 in which its upper surface is in line with the lower side of the channel through the knife block by a spring 454. The blade 448 is periodically withdrawn to the rear to permit a type bar thereon to be moved into the galley by the mechanism to be presently explained.

In front of and slightly above the blade 448 is an angular rod 455 slidably mounted in bearings 456 and adjustably mounted on this rod is a finger 457 which extends into the path of the type bars just above the blade 448. This finger is adjusted for different lengths of type bars, or for a plurality of slugs or logotypes so that when a sufficient amount of matter is delivered to the blade 448 to form a line of column width in the galley the finger 457 and the rod 455 will be moved slightly to the left, rocking a lever 458 which is connected by a link 459 with a slide 460. This slide is provided with an opening 461 through which a vertical bar 462 moves and the upper end 463 of this bar, which is preferably grooved, is adapted to coöperate with the lever arm 452 when the slide 460 moves the upper end of the bar 463 under the grooved hub 453. The bar 463 is moved up and down once during each revolution of the cam shaft 200 by the "galley cam" shown in Fig. 1. It will thus be apparent that when a full line is assembled on the blade the bar 462 will be positioned by the bar 455 to rock the lever 452 upward, causing the withdrawal of the blade 448 from under the type bar or assembled matter. Just as the blade 448 is withdrawn a pusher 464 carried by arms 465 on a rock shaft 466 is forced down by contact rollers 467 which are carried by the arms 449. This pusher moves the new line and the matter in the galley downward sufficiently to permit the blade 448 to return to receive the succeeding line. The pusher is returned to normal raised position by a spring 468.

The bar 462 should be moved to the left, out of alinement with the hub 453, when it has moved the arm 452 once, and this is accomplished by means of a roller 462$^a$ on an elbow lever 462$^b$, shown in dotted lines in Fig. 6. As the bar 462 moves upward to rock the arm 452 the lever 462$^b$ yields, but on the downward movement of the bar 462 a cam projection 462$^c$ is engaged by the roller 462$^a$ and the bar 462 is moved out from under the hub 453 and it remains out until another line rocks the lever 458. The cam 462$^c$ also moves the parts 458, 459 and 460 to normal position shown in Fig. 32.

The matter in the galley is supported by a slide 469 which is frictionally held in any desired elevation by shoes 470 pivoted at 471, being normally pressed against the side flanges of the galley by a spring 472 (Figs. 6 and 33), the spring being inclosed in a tubular casing. It will be understood that the slide 469 is adjusted to a position just below the blade 448 when the galley is empty and that it is pushed down by the pusher 464 as each new line is added to the galley. It will also be understood that the spring 472 and the shoes 470 are adapted to frictionally sustain the slide and the column of matter resting thereon. The galley is also provided with a horizontally adjustable vertical guide 473 which is mounted in a groove in the slide 469 and which should be adjusted in the groove to the width of the column being assembled. The function of this guide or support is to hold the left ends of the lines in register and prevent the column from tipping.

*Matrix elevators and distributing mechanism.*

I have previously described the manner in which the presentation slide is raised by engagement with the slide 320 (Figs. 4, 11$^c$ and 11$^d$) to carry the matrices from a casting level to the level at which the matrices are taken by the second elevator and the space bands are moved or shifted into the space band magazine. The slide 320 may be termed the first elevator.

The second elevator is substantially the same as in the ordinary linotype machine. It comprises a pivoted arm 474 (Figs. 1, 2 and 4) on a rock shaft 475 on which is mounted a second arm 476 connected by a link 477 having a spring portion 478 with a cam lever 479. The lever 479 is pivoted at 480 and carries a roller 481 bearing upon a cam 482 on the cam shaft 200, which cam is designated "second elevator cam" on Fig. 1. As in the linotype machine, the elevator arm 474 carries a ribbed rail 483 which is adapted, when the elevator is in its uppermost position, as shown in Figs. 1 and 2, to aline with the distributer rail above the magazine. When the arm swings forward into a substantially horizontal position the rail 483 is in line with the toothed notches in the matrices in the position to which the line of matrices and space bands are carried by the first elevator. The details of the devices for suspending the ribbed rail 483 from the arm 474 may be understood to be the same as in the linotype machine and will not be herein described, and the same is true of the details of the distributer screws and mutilated toothed distributing rail. A pivoted latch 479ª engages a pin 479ᵇ on lever 479 and normally prevents said lever from following its cam. A projection 482ª on cam 482 raises the latch 479ª and permits the lever 479 to follow its cam if the second elevator is free. If, however, the second elevator sticks or hesitates to come down the latch reëngages the lever and prevents the elevator from coming down and doing damage when the roller 481 is opposite a low point on the cam.

While the matrices are being raised by the first elevator, the second elevator moves down to bring its rail 483 into position to receive the matrices, and a pusher moves the matrices on to this rail. The rail then rises drawing the matrices away from the space bands, which do not engage the rail 483, and the space bands are then moved into their magazine C by the further movement of the same pusher. The operation of this pusher or transfer device will now be described.

Referring to Figs. 1, 2, 6, 33, 35 and 36, the matrix pusher 484 is a U-shaped device carried by an arm 485 on a slide 486 running in suitable horizontal guides. The matrices and space bands are brought up by the first elevator against a fixed V-shaped guide 487 which holds them in alinement while they are being transferred to the second elevator. The the slide 486 is operated by a link 488, an arm 489 pivoted at 490, and cam lever 491 operated by a matrix shifter cam 492 on the shaft 200. The arm 489 is yieldingly connected with the cam lever 491, being pivoted thereon at 493 and retained in its normal position as shown in Figs. 1 and 2 by a spring latch 494. This latch will yield and permit the arm to "break" at the point 493 when there is any obstruction to the movement of the shifting slide 486. The guides 486ª extend over to a position in rear of the space band magazine C and the matrix pusher 484 stands normally in its right hand position at the entrance to the space band magazine, the normal position of its operating arm 489 being as shown in Fig. 1. When the cam shaft starts the pusher moves to the extreme left position shown in Fig. 35. It then advances sufficiently to push the line of matrices on to the second elevator and rests a moment until the second elevator raises the matrices. The pusher then advances to drive the space bands into their magazine.

A safety device is provided to prevent the operation of the line shifter or pusher in case the first elevator has not brought the matrices to the proper elevation; a second safety device prevents the operation of the pusher in case the second elevator is not down to its lowest position ready to receive the matrices; and a third safety device operates to stop the machine and prevent the full rotation of the main cam shaft in case the matrix line shifter is released by the first two safety devices but fails to complete its movement to carry the space bands into their magazine. These safety devices will now be described.

When the matrix line shifter slide 486 is drawn back to its left hand position as shown in Figs. 34 and 35, a notch 495 in the slide is engaged by a latch 496 (Fig. 4), unless this latch is held up by engagement with the rail 270 (Figs. 11ª 11ᵇ) on the presentation slide when the latter is raised by the first elevator. In case the first elevator does not operate properly the latch will prevent the slide 486 from moving to the right and the arm 489 will "break" at the joint 493. This will result in the stoppage of the machine by means of the third safety device, to be presently explained.

The second safety device comprises a latch lever 497, the left end 498 of which is normally depressed by a spring 499 into the path of a projection 500 on the pusher arm 485 (Figs. 35 and 36). The right end 501 of the lever 497 is in the path of a projection 501ª (Fig. 2) of the second elevator arm 474 and when this arm moves down fully into position to receive a line of matrices it depresses the end 501 and raises the latch 498 permitting the transfer slide to operate to move the matrices on to the elevator; otherwise, the latch will prevent the slide from moving and the machine will be stopped as presently described.

The third safety device, which will stop the machine before the cam shaft makes a full revolution in case the matrix transfer slide is detained by one or the other of the safety latches, or fails to move properly to the right, or any other cause, operates as follows:

A lever 502 (Figs. 34, 35 and 36) has pivotally connected to it a rod 503, the left end of which slides in a guide 504 and is intercepted in its sliding movement by a latch 505 pivoted at 506 and normally pressed into the path of the rod 503 by a spring 507. The forward end of this latch carries a roller 508 which is normally in the path of an incline 509 on the transfer slide 486. When the transfer slide is not prevented from moving to the right by the safety devices or any other obstruction, the latch 505 is moved out of the path of the slide 503 and the lever 502 is permitted to operate in its normal manner, to be presently described, but if the lever 502 is obstructed in its operation by the latch 505 the machine will be stopped before a full revolution of the cam shaft by the following means.

Referring to Figs. 15 to 18 inclusive, the lever 502, which is pivoted on a suitable bracket 510, has a downwardly extending arm 502$^a$, the lower end of which is connected by a link 511 with the short arm of a lever 512 which is pivoted at 513 to a suitable bracket. The long arm of the lever carries a roller 514 which is normally pressed into contact with an annular flange 515 by a spring 516 on the hub of the lever 502 (Fig. 17) which spring also normally tends to move the upper end of the lever 502 to the left. When the upper end of the lever 502 is not obstructed in its movement by a latch 505 (Fig. 34) the roller 514 travels on the flange 515 throughout the rotation of the cam shaft 200 and it enters the depression 515$^a$ and moves back a sliding bolt 517 which in turn moves back the emergency latch 199 into its recess at the moment that this latch reaches the stopping lever 202 (Figs. 16, 17 and 18), permitting the latch to pass the stopping lever and thus permitting the cam shaft to make a full revolution until it is stopped by contact of the latch 198 with the lever 202, as heretofore explained. If the line transfer slide does not operate to release the lever 502 the movement of the upper end of the lever to the left will be stopped by the latch 505 and the roller 514 will be prevented from entering the recess 515$^a$, and hence the latch 199 will encounter the lever 202 and immediately stop the rotation of the cam shaft and prevent the further operation of the second elevator, at the same time indicating to the operator that something is wrong with the elevators or the transfer slide. When the machine is operating properly the transfer slide will move the line of matrices and space bands on to the second elevator, the second elevator will then raise the matrices, leaving the space bands on suitable supporting rails and the transfer slide will then move forward and carry the space bands into their magazines. The first elevator will move down and become disconnected from the presentation slide, which will then be in position to receive a new line of casting.

When a line of matrices is raised into alinement with the distributing mechanism, it is moved off of the second elevator and carried onto the distributer by a finger 518 carried by a slide 519 running in a guide 520. The slide 519 is operated by a link 521, and an arm 522, (Figs. 1, 2 and 12). The arm 522 is fast on a rock shaft 523, and its upper end is urged to the right to carry the matrices in the distributing mechanism by a spring 524. The rock shaft 523 has an arm 525 and in the socket of this arm is a side spring 526 (Fig. 12), the lower end of which is connected to an elbow lever 527. The lower arm of the elbow lever is in the path of a cam projection 528 which is marked "Distributor shifter cam" on Fig. 1, this cam being a projection on the matrix line shifter cam. The spring 526 is strong enough to overcome the spring 524 and withdraw the shifter arm 522. While the second elevator is down bringing the shifter finger into position to move the matrices from the elevator when it rises, the spring 524 permits the shifter to stop in case there is any obstruction to the passage of the matrices into the distributer.

In Figs. 2, 38, 39, there is shown a font distinguishing device to prevent a matrix from entering the distributer in case it does not belong to the font which should go into the magazine which is in operative relation to the distributer. The font distinguisher comprises a slide 529 which can be set to any desired position by a lever 530 and suitable scale 531. The slide 529 carries a finger 532 which is alined with a notch 533 in the matrices M of the font which is in use. It will be understood that the matrices in any given font are notched alike, and differently from the other fonts. Hence if there is a matrix in a line which does not belong to the magazine which is operatively connected with the distributer, it will be stopped by the finger 532 and the pusher 518 will not move farther to the right to carry matrices into the distributer until this matrix is removed from the line. The font distinguisher is very simple and can be instantly set for any one of a large number of fonts.

The operation of the machine has been described in connection with the foregoing specification with sufficient detail to enable those skilled in the art to fully understand the same.

Having thus described the invention what is claimed as new and desired to be secured by Letters Patent is:

1. In a typographic machine, the combination with an assembler slide adapted to receive a line of matrices and spaces, of means for moving the assembler slide to carry the line from assembling to casting position, comprising a constantly moving part, a clutch normally out of engagement with said part, a starting key adapted to cause coöperation of the clutch members, means to move the slide when the starting key is operated, and means to prevent engagement of the clutch members in case other parts of the machine are not in position to receive the assembled line.

2. In a typographic machine, the combination with an assembler slide, of a cam and connections for operating said slide automatically, a starting key for bringing the cam into operation, and means to prevent engagement of the clutch members in case other parts of the machine are not in position to receive the assembled line.

3. In a typographic machine, the combination with an assembler slide, of a cam and connections for operating said slide automatically, a starting key for bringing the cam into operation, a main cam shaft, and a safety device controlled by the main cam shaft for preventing premature operation of the assembler slide.

4. In a typographic machine having an assembler slide and a casting mechanism, means for moving the assembler slide to transfer an assembled line to the casting mechanism comprising a normally stationary cam, a normally rotating clutch member, a starting key for engaging the clutch member with the cam, and a safety device automatically controlled by the means which operates the casting mechanism to prevent premature transfer of the line to the casting mechanism.

5. In a typographic machine having assembling and casting mechanism, the combination with an assembler slide movable to transfer an assembled line to the casting mechanism, a cam and connections for operating the assembler slide, a main cam shaft, means operated by the main cam shaft to prevent operation of the assembler slide until the main shaft has completed a rotation, and a starting key and connections for bringing the said cam into operation, subject to the control of the said main cam shaft.

6. In a typographic machine having an assembling and casting mechanism, the combination of a main cam shaft and connections for operating the casting mechanism, an assembler slide, power operated means for moving said slide to transfer a line of matrices from the assembling mechanism to the casting mechanism, and means controlled by said assembler slide for starting the main cam shaft.

7. In a typographic machine having an assembling and casting mechanism, the combination of a main cam shaft and connections for operating the casting mechanism, an assembler slide, power operated means for moving said slide to transfer a line of matrices from the assembling mechanism to the casting mechanism, and means operated by the assembler slide upon its return movement for starting the main cam shaft.

8. In a typographic machine having an assembling and casting mechanism, the combination of a main cam shaft adapted to operate the casting mechanism, an assembler slide movable to transfer a line of matrices from the assembling to the casting mechanism, means for limiting the normal movement of the main cam shaft to a single rotation, a starting key, means brought into operation by the starting key for operating the assembler slide, and means controlled by the main cam shaft to prevent operation of the assembler slide until the said cam shaft has completed a rotation.

9. In a typographic machine having an assembling and casting mechanism, the combination of a main cam shaft adapted to operate the casting mechanism, an assembler slide movable to transfer a line of matrices from the assembling to the casting mechanism, means for limiting the normal movement of the main cam shaft to a single rotation, a starting key, means brought into operation by the starting key for operating the assembler slide, means controlled by the main cam shaft to prevent the operation of the assembler slide until the said cam shaft has completed a rotation, and means operated by the assembler slide on its return movement for automatically starting the main cam shaft.

10. In a typographic machine having an assembling and casting mechanism, an assembler slide for receiving a line of matrices and transferring the same to the casting mechanism, in combination with a brake bearing on the assembler slide and adapted to control its forward movement during the assembling of a line of matrices, means for lifting and holding the brake out of contact with the slide during the movement of the slide after the line is assembled, and means on the slide for operating said lifting means.

11. In a typographic machine having an assembling and casting mechanism, an assembler slide for receiving a line of matrices and transferring the same to the casting mechanism, in combination with a brake bearing on the assembler slide and adapted to control its forward movement during the assembling of a line of matrices, and means for relieving the pressure of the brake during the movement of the slide after the line is assembled, said last named means comprising a lever coöperating with said brake to lift the same from the slide, and an abutment on the slide for actuating said lever.

12. In a typographic machine, the combination with an assembler slide having a brake surface, of a movable brake coöperating therewith, means for normally exerting spring pressure on the brake, and means for automatically relieving said pressure during a portion of the movement of the slide, said last named means comprising a lever secured to the frame of the machine in operative relation with said brake, and an abutment on said slide for moving the lever.

13. In a typographic machine having an assembling and casting mechanism, an assembler slide for transferring a line of matrices from the assembling mechanism to the casting mechanism, a braking surface on said slide, a brake coöperating with said surface, means for exerting pressure on said brake while the slide is moving forward, and means for relieving said pressure during the rearward movement of said slide.

14. In a typographic machine having an assembling mechanism and a casting mechanism, an assembler slide movable to transfer a line of matrices from the assembling mechanism to the casting mechanism, a brake surface on said slide, a brake operating on said surface, and a device mounted on the slide and arranged to relieve the pressure on the brake in the forward movement of the slide and to restore said pressure on the completion of the rearward movement.

15. In a typographic machine, the combination with an assembling mechanism and a casting mechanism, of an assembler slide in which a line of matrices is assembled, a finger pivotally mounted in the slide against which the line of matrices is assembled, a latch for normally holding the finger in position to restrain the matrices, a spring tending to move the finger out of the path of the matrices, means operated on the forward movement of the slide to withdraw the latch, and means operating on the rearward movement of the slide to restore the finger and latch into position to receive a new line of matrices.

16. In a typographic machine having an assembling mechanism and a casting mechanism, an assembler slide arranged to receive a line of matrices and transfer them to the casting mechanism, said slide having a vertically movable finger thereon normally below the matrices in the slide, and means for raising said finger on the completion of a line of matrices into position to support the rear end of the line and forward the same to the casting mechanism.

17. In a typographic machine having an assembling and casting mechanism, the assembling mechanism comprising a star wheel, an assembler slide arranged to receive a line of matrices, a finger vertically movable on said slide, and means for raising said finger in advance of the star wheel to support a line of matrices assembled by the star wheel, said finger being normally below the level of the star wheel.

18. In a typographic machine having matrix assembling mechanism, an assembler slide in which a line of matrices may be assembled, a finger on said slide in position to support the forward end of the line, and a second finger on said slide normally out of register with the line of matrices movable into position to support the rear end of the line.

19. In a typographic machine having matrix assembling mechanism, an assembler slide in which a line of matrices may be assembled, a finger on said slide in position to support the forward end of the line, and a second finger on said slide normally out of register with the line of matrices movable into position to support the rear end of the line, said latter finger being adjustable relatively to the assembler slide to adapt it to support lines of different lengths.

20. In a typographic machine having assembling mechanism, an assembler slide movable to receive and transport a line of matrices, a finger on said slide in advance of the line for supporting the forward matrix therein, a finger slidably movable on the assembler slide for supporting the rearmost matrix line, a lever connected to move said latter finger, means for holding said finger in its lower or normal position during the assembling of a line, a spring for raising the finger when the line is assembled to permit it to engage and support the rearmost matrix, and means operating to withdraw said finger when the assembler slide is moved to position to receive a new line of matrices.

21. In a typographic machine, the combination with an assembler slide adapted to receive and deliver a line of matrices, of a finger slidably mounted on the slide and adapted to move into and out of position to support the rear matrix of a line, a spring actuated lever connected to said finger, means for restraining the lever to hold the finger normally out of the line receptacle, means for automatically releasing the lever when the line is full to permit the finger to move into position in rear of the last matrix, and means for automatically returning the lever and finger to normal position after the assembler slide has delivered a line of matrices.

22. In a typographic machine having an assembling and casting mechanism, the combination with an assembler slide, a movable body piece for the mold, and a common means for setting the body piece to determine the length of the mold opening and for setting the assembler slide to receive a line of matrices corresponding in length to the mold opening.

23. In a typographic machine having a casting and an assembling mechanism, a mold having a movable body piece, a stepped gage for the body piece to determine the length of the mold opening, an assembler slide, and a finger on said slide adjustable to determine the length of line of matrices which may be assembled in the slide, and means connected with the stepped gage for determining the setting of said finger corresponding with the mold opening.

24. In a typographic machine having an assembling and casting mechanism, the combination with a mold, a slidable body piece, a block to which said body piece is connected, a bar connected to said block and constituting one of the jaws for sustaining the matrices at the mold, a stepped gage for positioning said jaw and body piece, and means comprising a scale and index for setting said gage for different lengths of lines.

25. In a typographic machine, an assembler slide, means for operating said slide, a starting key for said operating means, and means to prevent operation of said operating means upon movement of said key in case the parts of the machine are not in position to receive an assembled line.

26. In a typographic machine, an assembler slide adapted to receive and deliver a line of matrices, a finger on said slide for supporting the front matrix of a line, a block adjustably mounted on said slide, a lever pivoted to said block, a vertically movable finger carried by said lever and adapted to be moved into position to support the rear end of an assembler line of matrices, said slide having a series of graduated notches representing different lengths of lines, and means on said block for engaging any one of said notches, whereby said vertically movable finger may be adjusted toward and from said first named finger to support lines of different lengths.

27. In a typographic machine, an assembler slide, means thereon for supporting the front end of an assembled line of matrices, said slide having a series of notches formed therein to represent lines of different lengths, a block adjustably secured to said slide and having means for engaging any desired one of said notches, a lever pivoted to said block, a finger carried by said lever, means for normally holding said lever and finger in a lowered position during the assembling of a line of matrices on the slide, and means for raising the finger to position the same at the rear of the assembled line.

28. In a typographic machine, an assembler slide adapted to receive and transfer an assembled line of matrices, a finger on said slide positioned to support the front matrix of the line, means for pressing the matrices toward said finger as they are delivered to the slide whereby said slide is caused to move as the line is being assembled, a vertically movable finger mounted on said slide and normally positioned beneath the matrix receptacle and adapted to be moved upwardly to engage the rear end of an assembled line of matrices, and means for automatically moving said finger upwardly when the assembling of a line is completed.

29. In a typographic machine, an assembler slide adapted to receive and transfer an assembled line of matrices, a finger on said slide positioned to support the front matrix of the line, means for pressing the matrices toward said finger as they are delivered to the slide whereby said slide is caused to move as the line is being assembled, a vertically movable finger mounted on said slide and normally positioned beneath the matrix receptacle and adapted to be moved upwardly to engage the rear end of an assembled line of matrices, means for automatically moving said last named finger upwardly when the assembling of a line is completed, means for moving the slide to deliver the assembled line and return the same to its original position, and means for automatically returning the said vertically movable finger to its normal position during the return movement of the slide.

30. In a typographic machine, a transfer slide, means thereon for supporting the front end of a line of assembled matrices, a finger on the slide for supporting the rear end of the line of matrices, means for automatically positioning said finger against the rear end of the line of matrices when the assembling of the line is completed, and means for moving said slide.

31. In a typographic machine, a slide for transferring an assembled line of matrices, a finger on said slide in position to support the forward end of the line while the same is being assembled and transferred, a second finger on said slide normally out of register with the line of matrices, means for automatically moving said second finger in position to support the assembled line of matrices, and means for moving the slide.

In testimony whereof I affix my signature.

FREDERICK W. LETSCH.